(12) United States Patent
Nemoto et al.

(10) Patent No.: US 6,481,314 B2
(45) Date of Patent: Nov. 19, 2002

(54) VEHICLE TRAVELLING CONTROL APPARATUS

(75) Inventors: Shusuke Nemoto, Amagasaki (JP); Toshiro Azuma, Amagasaki (JP)

(73) Assignee: Kanzaki Kokyukoki Mfg. Co. Ltd., Amagasaki (JP)

( * ) Notice: Subject to any disclaimer, the term of this patent is extended or adjusted under 35 U.S.C. 154(b) by 28 days.

(21) Appl. No.: 09/747,944

(22) Filed: Dec. 27, 2000

(65) Prior Publication Data
US 2001/0007212 A1 Jul. 12, 2001

(30) Foreign Application Priority Data

Jan. 7, 2000 (JP) .................................. 2000-001396
Feb. 9, 2000 (JP) .................................. 2000-031458

(51) Int. Cl.$^7$ ............................................. F16H 47/00
(52) U.S. Cl. ................................. 74/733.1; 60/448
(58) Field of Search .............. 192/109 F; 74/733.1, 74/732.1, 731.1; 60/431, 448; 477/69, 1; 475/80, 76, 72

(56) References Cited

U.S. PATENT DOCUMENTS

| | | | | |
|---|---|---|---|---|
| 4,528,871 A | * | 7/1985 | Nembach | 180/242 |
| 4,766,779 A | * | 8/1988 | Massy | 475/83 |
| 4,776,233 A | * | 10/1988 | Kita et al. | 475/76 |
| 5,009,126 A | * | 4/1991 | Meisinger et al. | 192/220 |
| 5,473,895 A | * | 12/1995 | Bausenhart et al. | 180/307 |
| 5,684,694 A | * | 11/1997 | Ishino et al. | 475/76 |
| 6,385,970 B1 | * | 5/2002 | Kuras et al. | 60/448 |

FOREIGN PATENT DOCUMENTS

JP          3-24366          2/1991

* cited by examiner

Primary Examiner—Charles A Marmor
Assistant Examiner—David D. Le
(74) Attorney, Agent, or Firm—Sterne, Kessler, Goldstein & Fox PLLC

(57) ABSTRACT

The present invention provides a vehicle traveling control apparatus for a vehicle with an HST and a mechanical transmission, which are connected in tandem to each other and interposed in a traveling power transmission path between a driving power source and driving wheels. The vehicle traveling control apparatus includes a speed-change control mechanism which in turn includes a signal detection part and a control part for controlling the changing of the output speed of the HST and the shifting operation of the mechanical transmission. The signal detection part includes a load-torque detection means. The control part is designed to control the mechanical transmission and the HST based upon the detected results by the load torque detection means so that where the vehicle lies in a high load torque state, the control part downshifts the mechanical transmission to a lower speed stage, while increasing the output speed of the HST.

8 Claims, 22 Drawing Sheets

VEHICLE TRAVELLING CONTROL APPARATUS

BACKGROUND OF THE INVENTION

The present invention relates to a vehicle travelling control apparatus for a vehicle with a hydrostatic transmission (hereinafter referred to as HST) and a mechanical transmission connected in tandem to the HST.

It is known from Japanese Unexamined Patent Application Publication (Kokai) No. H3-24366 for example that, in a vehicle with the HST and the mechanical transmission connected in tandem to the HST, the shifting operation of the mechanical transmission is automatically performed according to changes in load torque during vehicle travels.

The vehicle travelling control apparatus of the type disclosed in the above-cited publication is designed to automatically upshift and downshift the mechanical transmission according to changes in load torque due to various vehicle travelling conditions, so that a proper drive torque adapted to varying load torque in various travelling conditions can be obtained, while preventing a troublesome manual operation to be made for the gear-changing of the mechanical transmission in the conventional apparatus.

Specifically, the vehicle travelling control apparatus disclosed in the cited publication is designed to detect the hydraulic circuit pressure of the HST to downshift the mechanical transmission to a lower speed stage where the detected level is above a pre-set level for obtaining a higher drive torque, and upshift the same to a higher speed stage for a high speed travelling where the detected level is below the pre-set level.

The travelling control apparatus of the conventional type having the above arrangement omits the necessity of manual shift operation of the mechanical transmission for improvement of the operability of the vehicle. However, the apparatus of this type causes a great difference in speed due to shift-changes of the mechanical transmission. Hence, the ride quality of the vehicle may be deteriorated, and various adverse effects such as engine stall occur in some cases.

The present invention has been conceived to solve the above problems. It is an object of the present invention to provide a vehicle control apparatus for the vehicle with the HST and the mechanical transmission connected in tandem to the HST that is capable of automatically upshifting and downshifting the mechanical transmission according to varying load torque, while efficiently limiting speed variation of the vehicle due to the shift change of the mechanical transmission.

SUMMARY OF THE INVENTION

In consideration of the above cited prior art, according to the present invention, there is provided a vehicle travelling control apparatus for a vehicle with an HST and a mechanical transmission interposed in a travelling power transmission path between a driving power source and driving wheels. The vehicle travelling control apparatus includes a speed-change control mechanism which in turn includes a signal detection part and a control part for controlling the changing of the output speed of the HST and the shifting operation of the mechanical transmission. The signal detection part includes a load-torque detection means for detecting the load torque with respect to the vehicle. The control part is designed to control the mechanical transmission and the HST based upon the detected results by the load-torque detection means so that where the vehicle lies in a high load torque state, the control part downshift the mechanical transmission to a lower speed stage, while increasing the output speed of the HST.

According to the vehicle travelling control apparatus having the above arrangement, the mechanical transmission can automatically be downshifted to a lower speed stage in order to obtain a larger driving torque, where the vehicle lies in a high load torque state. It is also possible to effectively limit the variation of the vehicle speed due to the downshifting of the mechanical transmission.

The control part is preferably designed to control the mechanical transmission and the HST based upon the detected results by the load-torque detection means so that where the vehicle lies in a low load torque state, the control part upshifts the mechanical transmission to a higher speed stage, while decreasing the output speed of the HST.

With the thus designed control part, the mechanical transmission can automatically be upshifted to a higher speed stage in order to enable the vehicle to travel at higher speed, where the vehicle lies in a low load torque state. It is also possible to effectively limit the variation of the vehicle speed due to the upshifting of the mechanical transmission.

The vehicle travelling control apparatus having the above arrangement is preferably arranged in the following manner. Specifically, the HST includes a hydraulic pump and a hydraulic motor such as of the axial piston type and radial piston type connected to the hydraulic pump via a pair of hydraulic lines. The load-torque detection means is designed to detect whether the hydraulic pressure of the pair of hydraulic lines is above a reference level of high pressure side or below a reference level of low pressure side, thereby detecting which state out of the high load torque state, the low load torque state and a proper load torque state the vehicle lies in. The control part includes a memory for storing data concerning the relationship between the hydraulic pressure of the pair of hydraulic lines and the load torque of the HST, and a processor for calculating control signals transmitted to the HST and the mechanical transmission. The processor is designed to output control signals for the mechanical transmission and the HST based upon the detected signals from the load-torque detection means.

It is also preferable to employ the following arrangement. Specifically, the signal detection part includes a displacement-amount detection means for detecting the displacement amount of an output control member of the HST, and a lever pivoting angle detection means for detecting the pivoting angle of a operation lever designed to manually control the output control member of the HST. The memory is also designed to store data concerning a vehicle-speed-to-displacement-amount-relationship which is the relationship between the displacement amount of the output control member and the vehicle speed. The processor is designed to detect by using the displacement amount of the output control member inputted from the displacement-amount detection means a current vehicle speed based upon the vehicle-speed-to-displacement-amount-relationship in a currently engaging speed stage of the mechanical transmission, and determine by using the detected current vehicle speed whether the mechanical transmission lies in a state enabling its speed changing, based upon the vehicle-speed-to-displacement-amount-relationship in a speed stage of the mechanical transmission to be subsequently engaged.

The processor is preferably designed to control by using the detected current vehicle speed the output control member so as to prevent variation of the vehicle speed due to the shifting operation of the mechanical transmission, based upon the vehicle-speed-to-displacement-amount-relationship in a speed stage of the mechanical transmission to be subsequently engaged, where the processor has determined that the shifting operation of the mechanical transmission can be performed.

The vehicle travelling control apparatus preferably includes a hydraulic-pressure control mechanism for controlling the hydraulic pressure of working fluid for effecting engagement and disengagement of clutch devices in the mechanical transmission. The hydraulic-pressure control mechanism is disposed within a hydraulic circuit acting as a feeding passage of the working fluid, and includes a delay relief valve for gradually increasing the hydraulic pressure of the working fluid fed to a clutch device of the clutch devices to be subsequently engaged from an initial hydraulic pressure level to a preset hydraulic pressure level. The delay relief valve is designed so that the diameter of a throttle aperture for regulating the amount of the working fluid acting on the control piston is enlarged according to the increase of the hydraulic pressure in a hydraulic circuit of the HST.

With the above arrangement, it is possible to properly control the hydraulic pressure of the working fluid during it is gradually raised from the initial hydraulic pressure level to the preset hydraulic pressure level according to the load torque to the vehicle. That is, it is possible to perform the shifting operation of the mechanical transmission in a shorter period of time with a higher engaging torque, as the load torque to the vehicle increases. Thus, it is possible to prevent an abrupt speed change or shift shock at the time of shifting operation of the mechanical transmission and other undesirable effects, and perform the shifting operation at ideal timing without using a complicated, high-precision and expensive electronic control system, and hence improve the ride quality of the vehicle.

The delay relief valve is preferably designed so that a control piston moves a valve for effecting communication with and shutting off to a drain line from an initial hydraulic pressure position to a preset hydraulic pressure position, against the biasing force of a hydraulic pressure setting spring biasing the valve towards a side enabling the shutting off to the drain line, when the delay relieve valve gradually increases the hydraulic pressure of the working fluid from the initial hydraulic pressure level to the preset hydraulic pressure level. The delay relief valve is also designed so that the initial hydraulic pressure position of the control piston moves closer to the preset hydraulic pressure position according to the increase of the hydraulic pressure in a hydraulic circuit of the HST.

With the above arrangement, it is also possible to produce the effects as described above. Specifically, it is possible to perform the shifting operation of the mechanical transmission in a shorter period of time with a higher engaging torque, as the load torque to the vehicle increases. Thus, it is possible to prevent an abrupt speed or shift shock change at the time of shifting operation of the mechanical transmission and other undesirable effects, and perform the shifting operation at ideal timing without using a complicated, high-precision and expensive electronic control system, and hence improve the ride quality of the vehicle.

The delay relief valve is also preferably designed so that a control piston moves a valve for effecting communication with and shutting off to a drain line from an initial hydraulic pressure position to a preset hydraulic pressure position, against the biasing force of a hydraulic pressure setting spring biasing the valve towards a side enabling the shutting off to the drain line, when the delay relieve valve gradually increases the hydraulic pressure of the working fluid from the initial hydraulic pressure level to the preset hydraulic pressure level. The delay relief valve is also preferably designed so that the diameter of a throttle aperture for regulating the amount of the working fluid acting on the control piston is enlarged according to the increase of the hydraulic pressure in a hydraulic circuit of the HST. Moreover, the delay relief valve is preferably designed so that the initial hydraulic pressure position of the control piston moves closer to the preset hydraulic pressure position according to the increase of the hydraulic pressure in a hydraulic circuit in the HST.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

Embodiment 1

Figure 1:
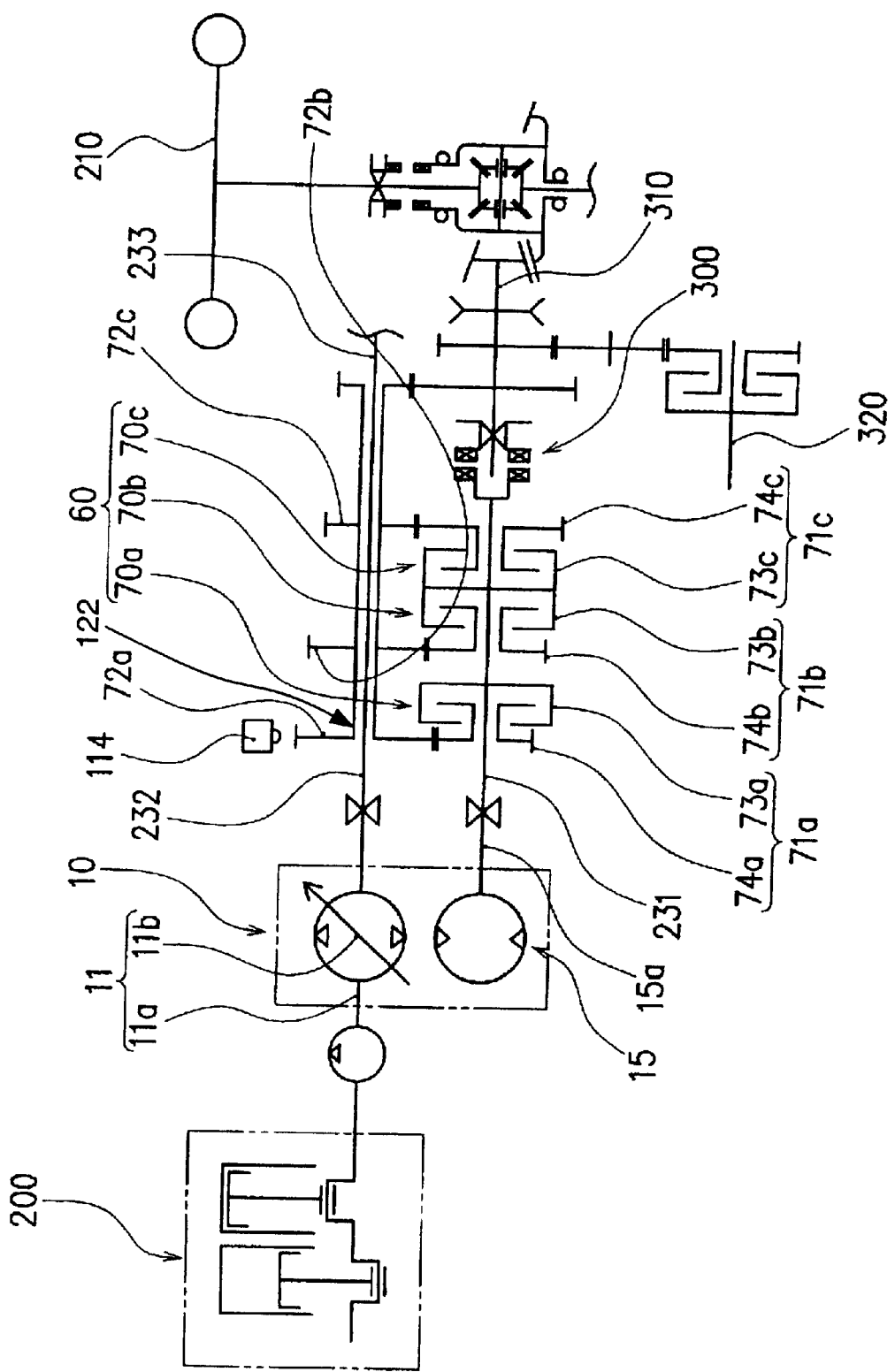
FIG. 1 illustrates a power transmission path of a vehicle to which one embodiment of the vehicle travelling control apparatus of the present invention is applied.

The description will hereinafter be made for a preferred embodiment of the travelling control apparatus according to the present invention with reference to the appended drawings. FIG. 1 is a model view of a power transmission path of the vehicle to which the vehicle travelling control apparatus of this embodiment is applied.

The traveling control apparatus of this embodiment includes an HST 10 and a mechanical transmission 60 coupled thereto in tandem that are interposed in the traveling power transmission path between a driving power source 200 and driving wheels 210 (see FIG. 1), and a speed-change control mechanism for controlling the speed-change of the HST 10 and the mechanical transmission 60.

A reference numeral 300 in FIG. 1 represents an emergency clutch for forcibly coupling a driving shaft 231 hereinafter described to an output shaft 310, which clutch is adapted to be used to transmit the power of the HST directly to the output shaft 310 in an emergency. A reference numeral 320 represents a PTO shaft of the front wheels, which is operatively coupled to the output shaft 310.

Figure 2:
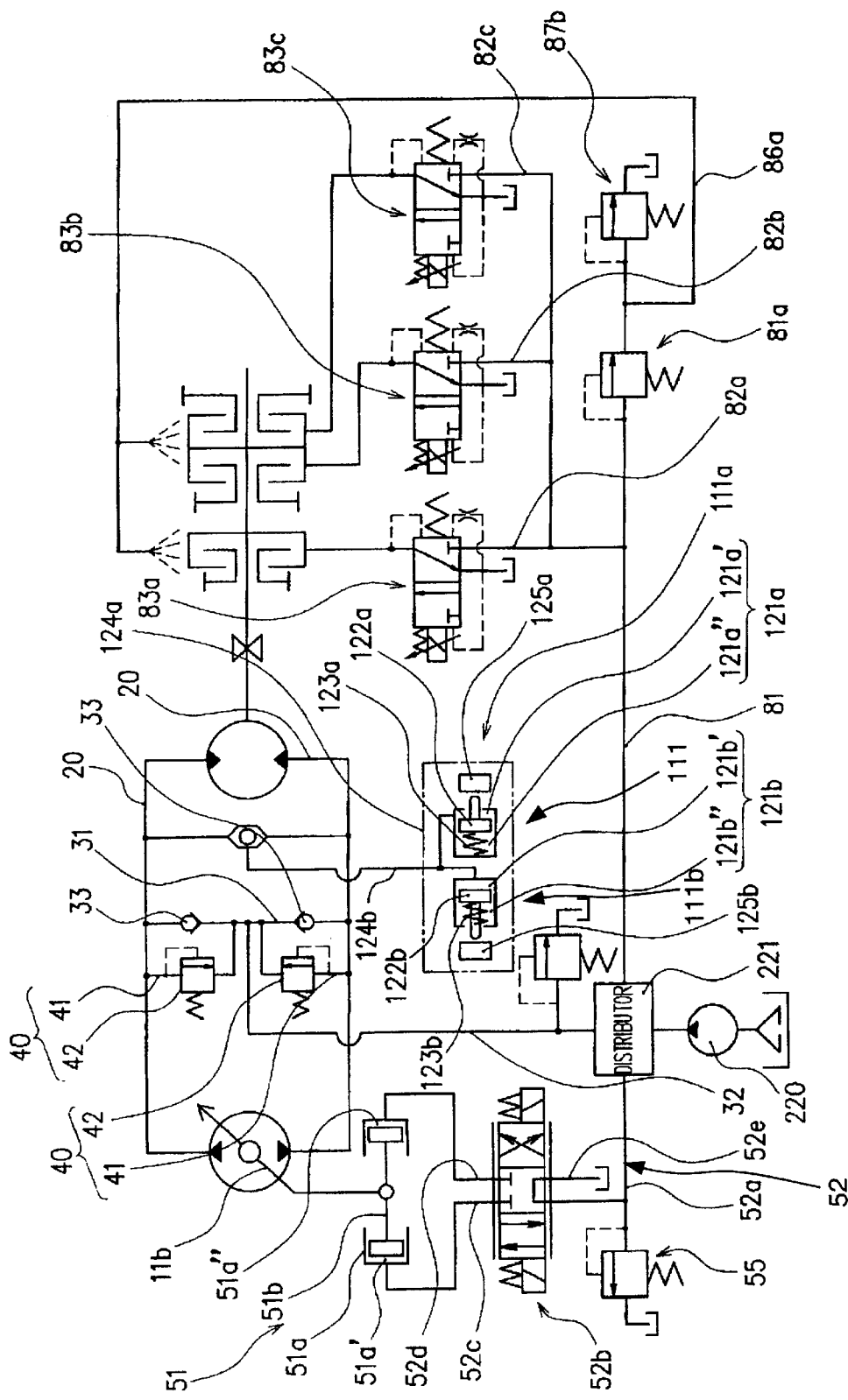
FIG. 2 is a hydraulic circuit diagram of the travelling control apparatus illustrated in FIG. 1.

Now, the description will be made for the HST 10 with reference to FIGS. 1 and 2. FIG. 2 is a hydraulic circuit diagram of the HST 10 and the mechanical transmission 60.

As illustrated in FIGS. 1 and 2, the HST 10 of this embodiment is of the type that includes a hydraulic pump 11 with a pump shaft 11a operatively coupled to a driving power source 200, a hydraulic motor 15 with a motor shaft 15a, and a pair of hydraulic lines 20 connecting the hydraulic pump 11 with the hydraulic motor 15 to constitute a closed circuit.

At least one of the hydraulic pump 11 and the hydraulic motor 15 is of a variable displacement axial piston type that includes a swash plate, so that the rotation of the motor shaft 15a is non-stepwisely varied relative to the rotation of the pump shaft 1a by operating the swash plate. In this embodiment, the hydraulic pump 11 and the hydraulic motor 15 are respectively of the variable displacement axial piston type with a swash plate 11b, and a fixed displacement axial piston type.

It is to be noted that, where the hydraulic pump and the hydraulic motor are of the variable displacement radial piston type, a cam ring is employed in place of the swash plate. Accordingly, in the description made hereinbelow and the drawings, the terms, "swash plate", "swash plate angle" or "swash plate tilting angle", and "vehicle-speed-to-swash-plate-angle-relationship" should respectively be interpreted as cam ring, displacement angle and vehicle-speed-to-displacement-angle-relationship, when the radial piston type is used in the HST. In addition, "output control member", and "displacement amount" referred above are generic terms which should respectively encompass both the swash plate and the cam ring, and both the swash plate angle and the displacement angle.

The HST 10 also includes a charging mechanism 30 for feeding pressurized hydraulic fluid to the pair of hydraulic lines 20, maximum working pressure setting mechanisms 40 for setting a maximum working pressure Pmax in a higher pressure side of the pair of hydraulic lines, and a swash-plate operation mechanism 50 for operating the swash plate.

The charging mechanism 30 includes a bypass line 31 for communication between the pair of hydraulic lines 20, a charge line 32 for feeding pressurized hydraulic fluid from the charge pump 220 to the bypass line 31, check valve 33 disposed in the bypass line 31 for allowing the pressurized hydraulic fluid to flow from the charge line 32 into the pair of hydraulic lines 20, while preventing the reverse flow of the pressurized hydraulic fluid from the pair of hydraulic lines 20 into the charge line 32.

In FIG. 2, a reference numeral 221 is a distributor for distributing the pressurized hydraulic fluid fed from the charge pump 220.

The maximum working pressure setting mechanisms 40 each includes a setting line 41 having a first end connected to a corresponding one of the pair of hydraulic lines 20 and a second end connected between the check valves 33 in the bypass line 31, and a relief valve 42 disposed in the setting line 41. The thus arranged maximum working pressure setting mechanisms 40 are designed to discharge the pressurized hydraulic fluid from the pair of hydraulic lines 20 through the relief valves 42, when the hydraulic pressure of the fluid exceeds the predetermined level.

The swash-plate operation mechanism 50 includes a control shaft (not shown) coupled to the swash plate 11b, a piston device 51 coupled to the control shaft via a suitable link mechanism, and a swash-plate operating line 52 for controlling the feeding of the pressurized hydraulic fluid to the piston device 51 which is connected to the swash plate 11b.

The piston device 51 includes a cylinder 51a and a piston 51b slidingly movable within the cylinder as dividing the cylinder 51a into a positive rotation chamber 51a' and a negative rotation chamber 51a".

The swash-plate operating line 52 includes a first pressurized fluid line 52a to which the pressurized hydraulic fluid is fed from a charge pump 220, a servo valve 52b connected to a rear end of the first pressurized fluid line 52a, a positive rotation line 52c and a negative rotation line 52d for communicating a rear side of the servo valve 52b to the positive rotation chamber 51a' and to the negative rotation chamber 51a" respectively, and a drain line 52e disposed on the front side of the servo valve 52b.

The servo valve 52b is designed to take various positions according to signals transmitted from a control part hereinafter described, namely a positive rotation position enabling the communications respectively between the first pressurized fluid line 52a and the positive rotation line 52c and between the drain line 52e and the negative rotation line 52d, a negative rotation position enabling the communications respectively between the drain line 52e and the positive rotation line 52c and between the first pressurized fluid line 52a and the negative rotation line 52d, and a neutral position enabling the closing of the positive rotation line 52c and the negative rotation line 52d.

The thus arranged swash-plate operation mechanism 50 takes actions as described below.

At the positive rotation position, the servo valve 52b enables the pressurized hydraulic fluid to be fed into the positive rotation chamber 51a' via the positive rotation line 52c, and discharged from the negative rotation chamber 51a" via the negative rotation line 52d. Accordingly, the piston 51b moves towards the right-hand side in FIG. 2 so that the control shaft is rotated in a first direction and the swash plate 11b is rotated in a positive direction. The positive rotation described herein represents a direction enabling the vehicle to travel forward.

On the contrary, at the negative rotation position, the servo valve 52b enables the pressurized hydraulic fluid to be discharged from the positive rotation chamber 51a' via the positive rotation line 52c, and the same to be fed into the negative rotation chamber 51a" via the negative rotation line 52d. Accordingly, the piston 51b moves towards the left-hand side in FIG. 2 so that the control shaft is rotated in a second direction and the swash plate 11b is rotated in a negative direction. Similarly, the negative rotation described herein represents a direction enabling the vehicle to travel rearward.

At the neutral position, the servo valve 52b enables the positive rotation chamber 51a' and the negative rotation chamber 51a" to close. Thus, the piston 51b is locked at its position, while the swash plate is held at a current position.

A reference numeral 55 in FIG. 2 represents a relief valve for setting the hydraulic pressure of the first pressurized fluid line 52a.

Now, the description will be made for the mechanical transmission 60. The mechanical transmission 60 as illustrated in FIGS. 1 and 2 includes several power shift devices 70 (three power shift devices 70a to 70c in this embodiment) for changing the speed between the driving shaft 231 and a driven shaft 232, and a speed-change operation mechanism 80 for actuating either one of the power shift devices 70.

In this embodiment, the driving shaft 231 is an intermediate shaft disposed coaxially with the motor shaft 15a and coupled to the motor shaft 15a in a non-rotatable manner relative to the axis of the motor shaft 15a. The driven shaft 232 is a cylindrical shaft disposed coaxially with the pump shaft 11a for rotatably receiving a PTO shaft 233 coaxially coupled to the pump shaft 11a in a nonrotatable manner relative to the axis of the pump shaft, thereby accomplishing the reduction of the entire size of the vehicle with the PTO shaft 233.

The power shift devices 70a to 70c respectively include clutch devices 71a to 71c supported on either one of the driving shaft 231 and the driven shaft 232, and fixed gears 72a to 72c non-rotatably supported on the remnant shaft.

The clutch devices 71a to 71c respectively include pressing members 73a to 73c non-rotatably and axially sidably supported on the aforesaid either one of the driving shaft 231, and idle gears 74a to 74c rotatably and axially non-slidably supported on the aforesaid either one of the driving shaft 231 and adapted to be brought into meshed engagement with the fixed gears 72a to 72c.

The pressing members 73a to 73c and the idle gears 74a to 74c are respectively provided with driving clutch discs (not shown). The clutch devices 71a to 71c are also respectively provided with biasing members (not shown) for biasing the respective driving clutch discs of the pressing members 73a to 73c and the idle gears 74a to 74c away from each other.

On the other hand, the speed-change operation mechanism 80 as illustrated in FIG. 2 includes a second pressurized fluid line 81 to which the pressurized hydraulic fluid is fed from the charge pump 110, a first-speed line 82a, a second-speed line 82b and a third-speed line 82c respectively having first ends connected to the second pressurized fluid line 81 and second ends respectively communicated with the clutch devices 71a to 71c, and a first-speed shift valve 83a, a second-speed shift valve 83b and a third-speed shift valve 83c respectively disposed in the first to third speed lines 82a to 82c.

The first to third-speed shift valves 83a to 83c respectively take an engaging position and a shutoff position respectively enabling the communication/shutoff of the first to third speed lines 82a to 82c based upon signals transmitted from the control part hereinafter described.

According to the thus arranged mechanical transmission 60, either one of the first to third speed lines 82a to 82c is communicated by controlling the first to third speedshift valves 83a to 83c, thereby obtaining the change gear ratio corresponding to the ratio of the number of teeth on one of the idle gears 74a to 74c of one of the clutch devices 71 to which the pressurized hydraulic fluid has been fed and the number of teeth on one of the fixed gears 72a to 72c corresponding to the one of the idle gears.

In FIG. 2, a reference numeral 81a represents a relief valve for setting the hydraulic pressure of the second pressurized fluid line 81. Reference numerals 86a and 86b also respectively represent a lubricant line branched from the second pressurized fluid line 81 and a relief valve for setting the hydraulic pressure of the lubricant line.

Figure 3:
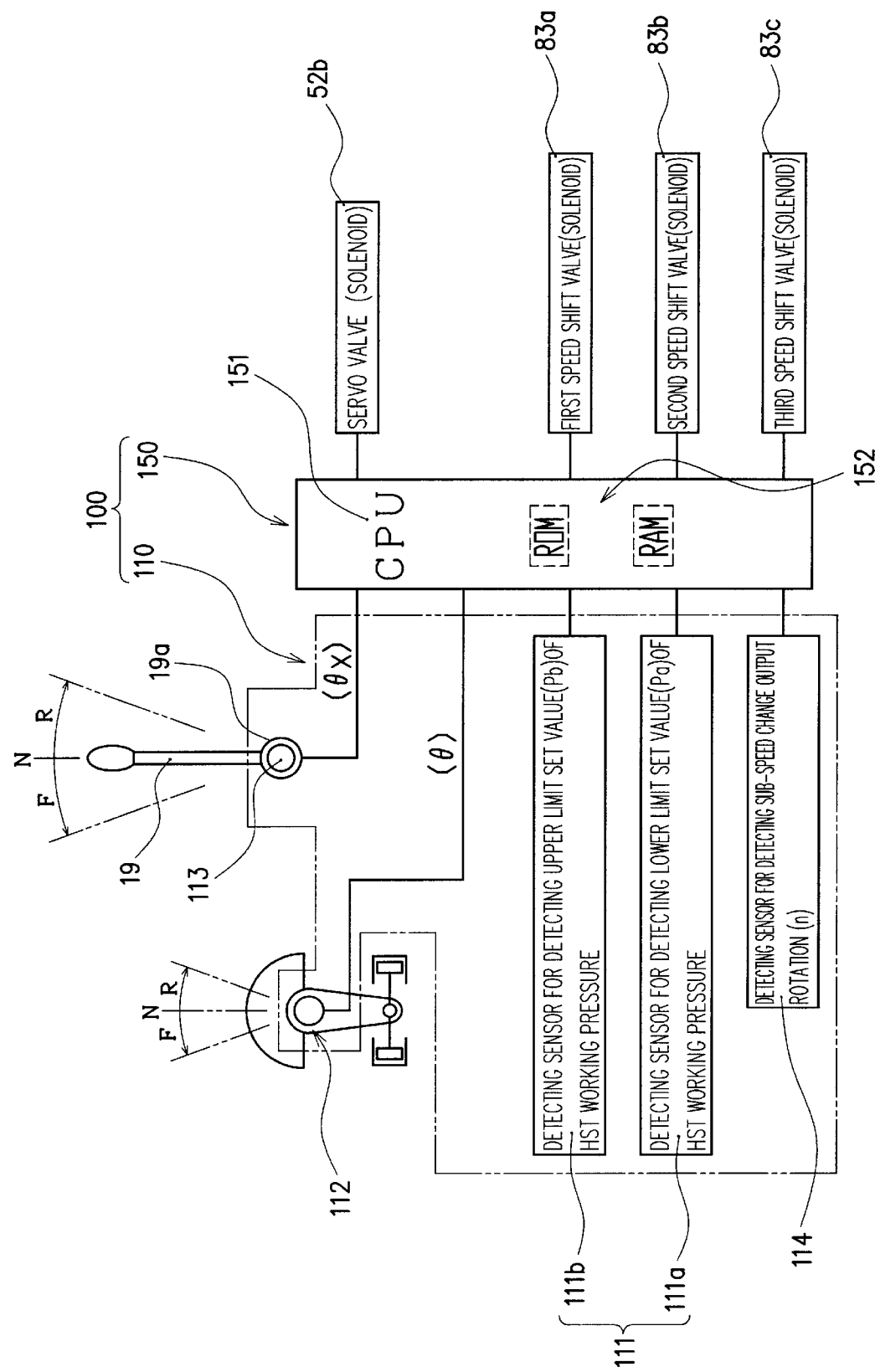
FIG. 3 is a block diagram of a speed-change control mechanism in the travelling control apparatus of FIG. 1.

Now, the description will be made for the speed-change control mechanism 100. FIG. 3 is a block diagram of the speed-change control mechanism 100. As illustrated in this Figure, it includes a signal detection part 110 and a control part 150.

The signal detection part 110 includes a load-torque detection means III for detecting the load torque of the HST 10, a swash-plate-angle detection means 112 for detecting the swash plate angle of the HST 10, a lever-pivoting-angle detection means 113 for detecting the pivoting angle of a operation lever 19 designed for manual control of the swash plate of the HST 10, and a rotation detection means 114 for detecting the rotation number of the driven shaft 122 of the mechanical transmission 60.

In this embodiment, potentiometers are disposed respectively on a trunnion shaft located at the pivoting center of the swash plate 11b and a operation lever rod 19a for pivotally moving the operation lever 19 to act as the swash-plate-angle detection means 112 and the lever-pivoting-angle detection means 113 (see FIG. 2).

The rotation detection means 114 is provided to detect whether or not the vehicle is actually travelling, and the vehicle speed is abruptly changed. Specifically, the rotation detection means 114 detects the rotation number of the driven shaft of either one of the tandemly arranged HST 10 and mechanical transmission 60, which is disposed in the downstream side of the power transmission path to detect the presence or absence of the vehicle travel and the abrupt change of the vehicle speed.

In this embodiment, the mechanical transmission 60 is disposed on the downstream side of the HST 10, as illustrated in FIG. 1, so that the rotation detection means 114 is adapted to detect the rotation of the driven shaft 122 of the mechanical transmission 60.

The load-torque detection means 111 utilizes the proportional relationship between the HST working pressure and the HST load torque to detect the HST load torque.

Figure 4:
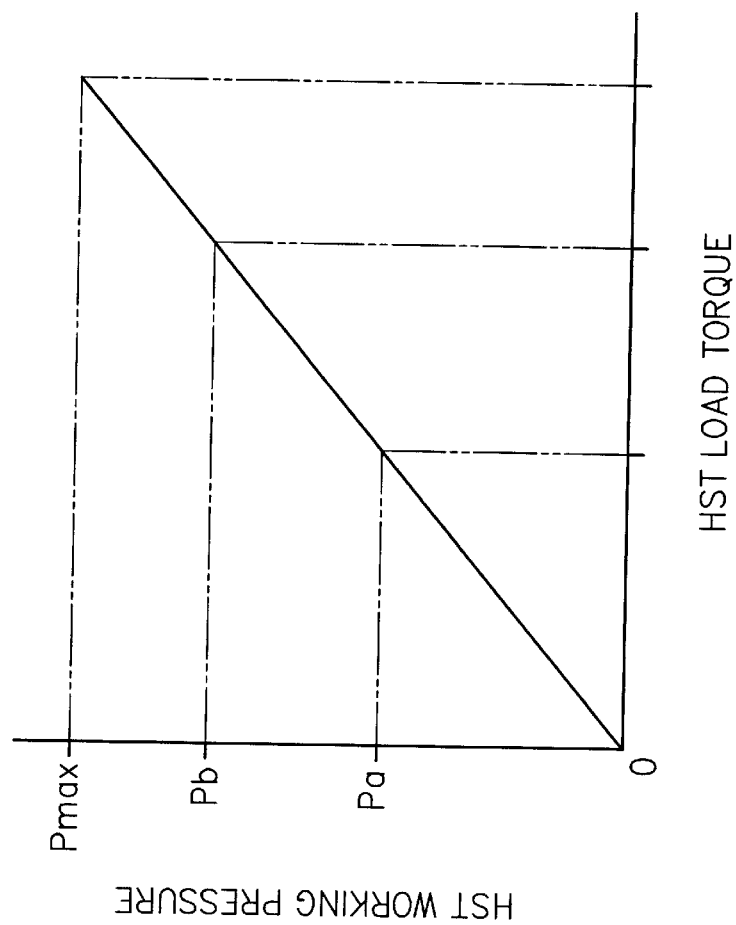
FIG. 4 is a graph showing the relationship between the HST working pressure and the HST load torque.

FIG. 4 illustrates the relationship between the HST working pressure and the HST load torque. As illustrated in this Figure, the HST load torque is proportional to the HST working pressure (the hydraulic pressure of the pair of hydraulic lines 20).

The load-torque detection means 111 utilizes the above relationship, based upon which the load-torque detection means detects the HST working pressure (P) as a low load torque state where it is below a reference level (Pa) of low pressure side, and as a high load torque state where it is above a reference level (Pb) of high pressure side.

Specifically, the load-torque detection means 111 includes a detection mechanism 111a for detecting a reference level (Pa) of low pressure side, and a detection mechanism 111b for detecting a reference level (Pb) of high pressure side, as illustrated in FIG. 2.

The detection mechanism 11a includes a first cylinder 121a, a first piston 122a slidably disposed within the first cylinder 121a as dividing the first cylinder 121a into a working chamber 121a' and a biasing chamber 121a" in a liquid-tight manner, a first biasing member 123a disposed within the biasing chamber 121a" for pressing the first piston 122a towards the working chamber 121a', and a first detection line 124a having a first end connected to the pair of hydraulic lines 20 and a second end communicating with the working chamber 121a'. The thus arranged detection mechanism acts in the manner as described below.

Where the pressing force effected by the pressurized hydraulic fluid fed from the pair of hydraulic lines 20 via the first detection line 124a is larger than the biasing force of the first biasing member 123a, or where the hydraulic pressure of the pair of hydraulic lines 20 is higher than the reference level (Pa) of low pressure side, the first piston 122a is pressed towards the biasing chamber 122a" against the biasing force of the first biasing member 123a by the pressing force of the pressurized hydraulic fluid. Where the pressing force effected by the pressurized hydraulic fluid fed from the pair of hydraulic lines 20 via the first detection line 124a is smaller than the biasing force of the first biasing member 123a, or where the hydraulic pressure of the pair of hydraulic lines 20 is lower than the reference level (Pa) of low pressure side, the first piston 122a is pressed towards the working chamber 121a' by the biasing force of the first biasing member 123a.

The detection mechanism 111a for detecting the reference level of low pressure side includes a first switching means 125a disposed in such a manner as to move away from the first piston 122a during the first piston 122a is pressed towards the biasing chamber 121a", and abut against the first piston 122a during the first piston 122a is pressed towards the working chamber 121a'. The first switching means 125a is designed to output a Pa detection signal.

Specifically, the detection mechanism 111a has the first piston 122a adapted to abut against the first switching means 125a when the hydraulic pressure of the pair of hydraulic lines 20 drops below the reference level of low pressure side, thereby rendering the reference level (Pa) of lower pressure side detectable.

On the other hand, the detection mechanism 111b for detecting the reference level (Pb) of high pressure side includes a second cylinder 121b, a second piston 122b slidably disposed within the second cylinder 121b as dividing the second cylinder 121b into a working chamber 121b' and a biasing chamber 121b" in a liquid tight manner, a second biasing member 123b disposed within the biasing chamber 121b" for pressing the second piston 122b towards the working chamber 121b', and a second detection line 124b having a first end connected to the pair of hydraulic lines 20 and a second end communicating with the working chamber 121b'. The thus arranged detection mechanism acts in the manner as described below.

Where the pressing force effected by the pressurized hydraulic fluid fed from the pair of hydraulic lines 20 via the second detection line 124b is smaller than the biasing force of the second biasing member 123b, or where the hydraulic pressure of the pair of hydraulic lines 20 is lower than the reference level (Pb) of high pressure side, the second piston 122b is pressed towards the working chamber 121b' by the biasing force. Where the pressing force effected by the pressurized hydraulic fluid fed from the pair of hydraulic lines 20 via the second detection line 124a is larger than the biasing force of the second biasing member 123b, or where the hydraulic pressure of the pair of hydraulic lines 20 is higher than the reference level (Pb) of high pressure side, the second piston 122b is pressed towards the biasing chamber 121b' against the biasing force of the second biasing member 123b by the pressing force of the pressurized hydraulic fluid.

The detection mechanism 111b for detecting the reference level of high pressure side includes a second switching means 125b disposed in such a manner as to move away from the second piston 122b during the second piston 122b is pressed towards the working chamber 121b', and abut against the second piston 122b during the second piston 122b is pressed towards the biasing chamber 121b". The second switching means 125b is designed to output a Pb detection signal.

Where the HST working pressure (P) is: $(Pa) \leq (P) \leq (Pb)$, neither the detection mechanism 111a nor the detection mechanism 111b outputs the detection signal. Accordingly, where both the detection mechanisms 111a and 111b do not output the detection signal, the control part 150 hereinafter described interprets the HST working pressure (P) as lying within the range defined by the formula: $(Pa) \leq (P) \leq (Pb)$ and hence the load torque as lying in a proper state, based upon that fact.

The control part 150 includes a processor 151 having a CPU, and a memory 152 having a ROM and a RAM.

Figure 5:
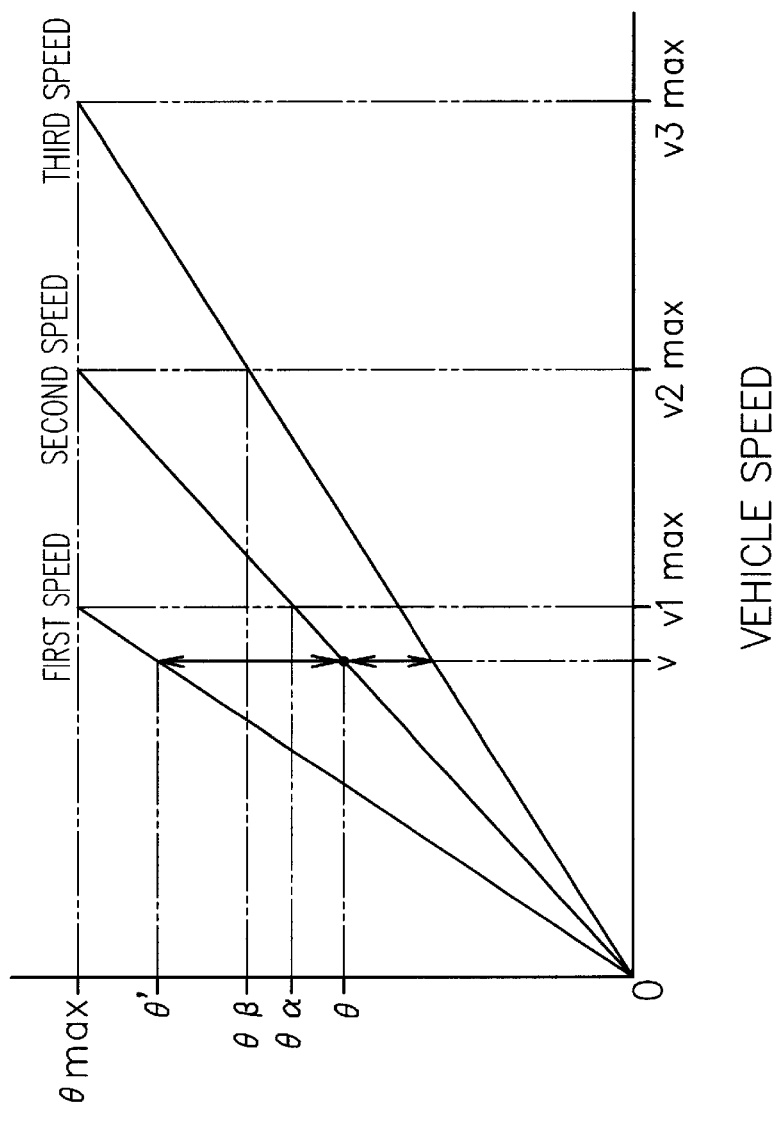
FIG. 5 is a graph showing the relationship between an HST swash plate tilting angle and the vehicle speed for the vehicle illustrated in FIG. 1, in which the relationship is shown for each speed stage of the mechanical transmission.

The memory 152 stores data concerning the relationship between the HST load torque and the HST working pressure (hereinafter referred to as "torque-to-pressure-relationship) as illustrated in FIG. 4, and the relationship between the vehicle speed and the HST swash plate angle (hereinafter referred to as "vehicle-speed-to-swash-plate-angle-relationship) for each speed stage engaged of the mechanical transmission as illustrated in FIG. 5.

The memory 152 also stores data for use in setting a switching condition for the shifting operation in the mechanical transmission 60.

The switching condition is meant to include the hydraulic pressure of the one speed-change line communicating with a currently engaging clutch device of the mechanical transmission 60, and the hydraulic pressure of the one speed-change line communicating with a clutch device to be subsequently engaged of the mechanical transmission 60, and the time involved in shifting from the currently engaging clutch device to the subsequently engaging clutch device. Specifically, the switching condition is stored as the relationship between the hydraulic pressure of the speed-change line and the time involved (hereinafter referred to as "pressure-to-time-relationship"). It is possible to prepare a plurality of the pressure-to-time-relationships according to the HST load torque.

The respective relationships described above may be stored as a look-up table or as a function.

Figure 7:
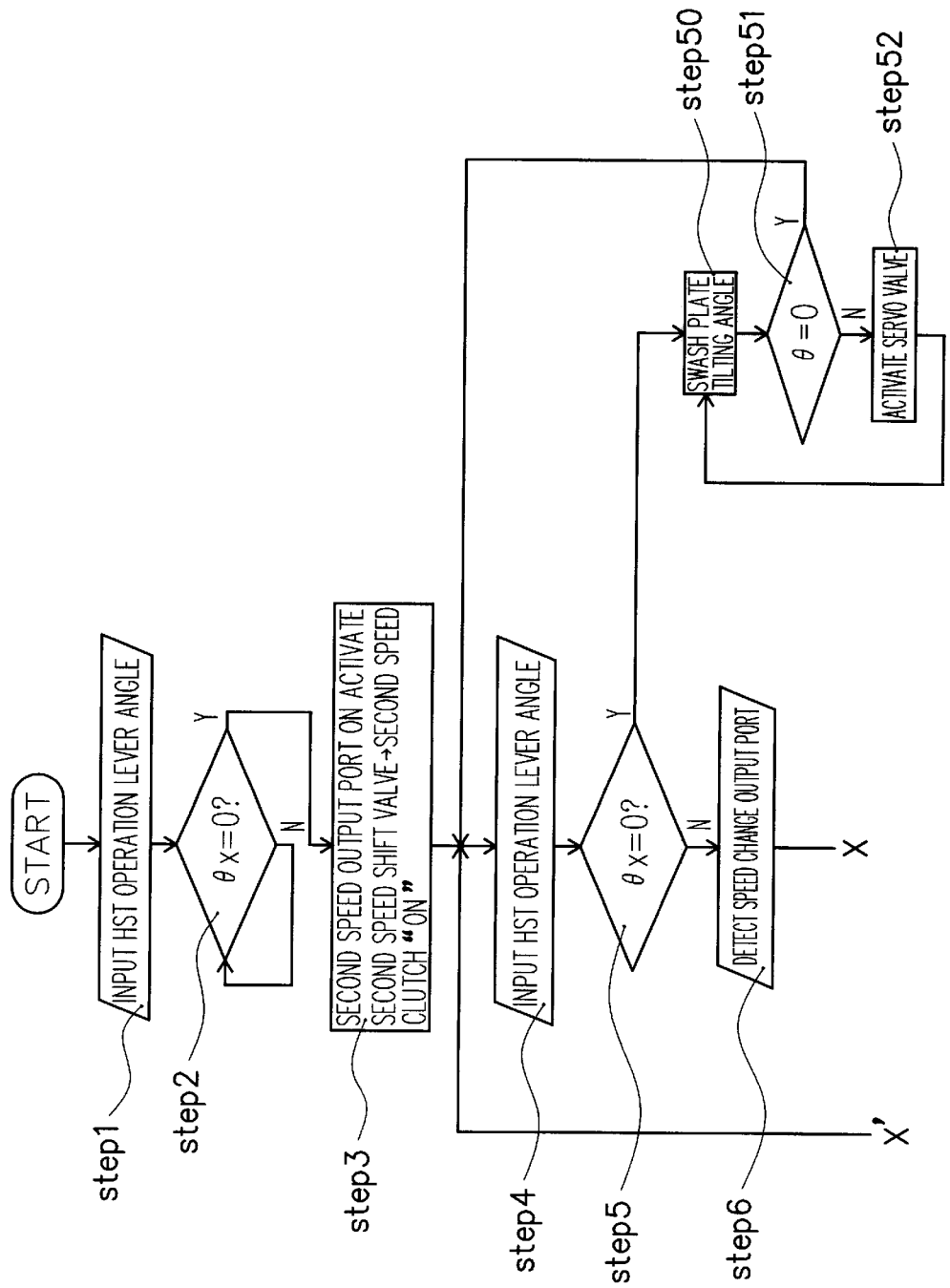
FIG. 7 is a former part of the control flow chart of a control unit.
Figure 8:
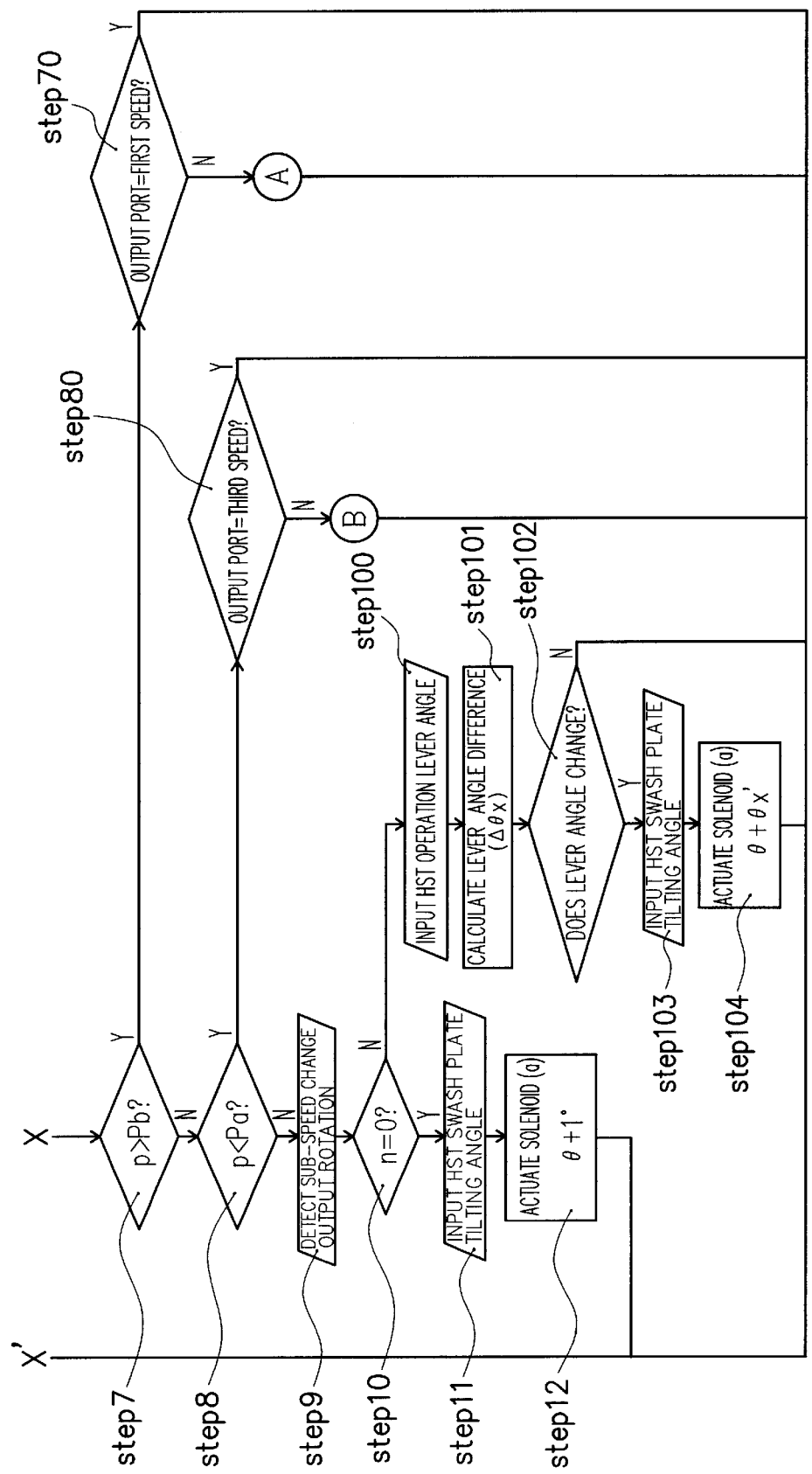
FIG. 8 is a latter part of the control flow chart of the control unit.

Now, the description will be made for a control flow chart by the control part 150 with reference to FIGS. 7 to 10. FIGS. 7 and 8 are respectively control flow charts performed by the control part.

Figure 9:
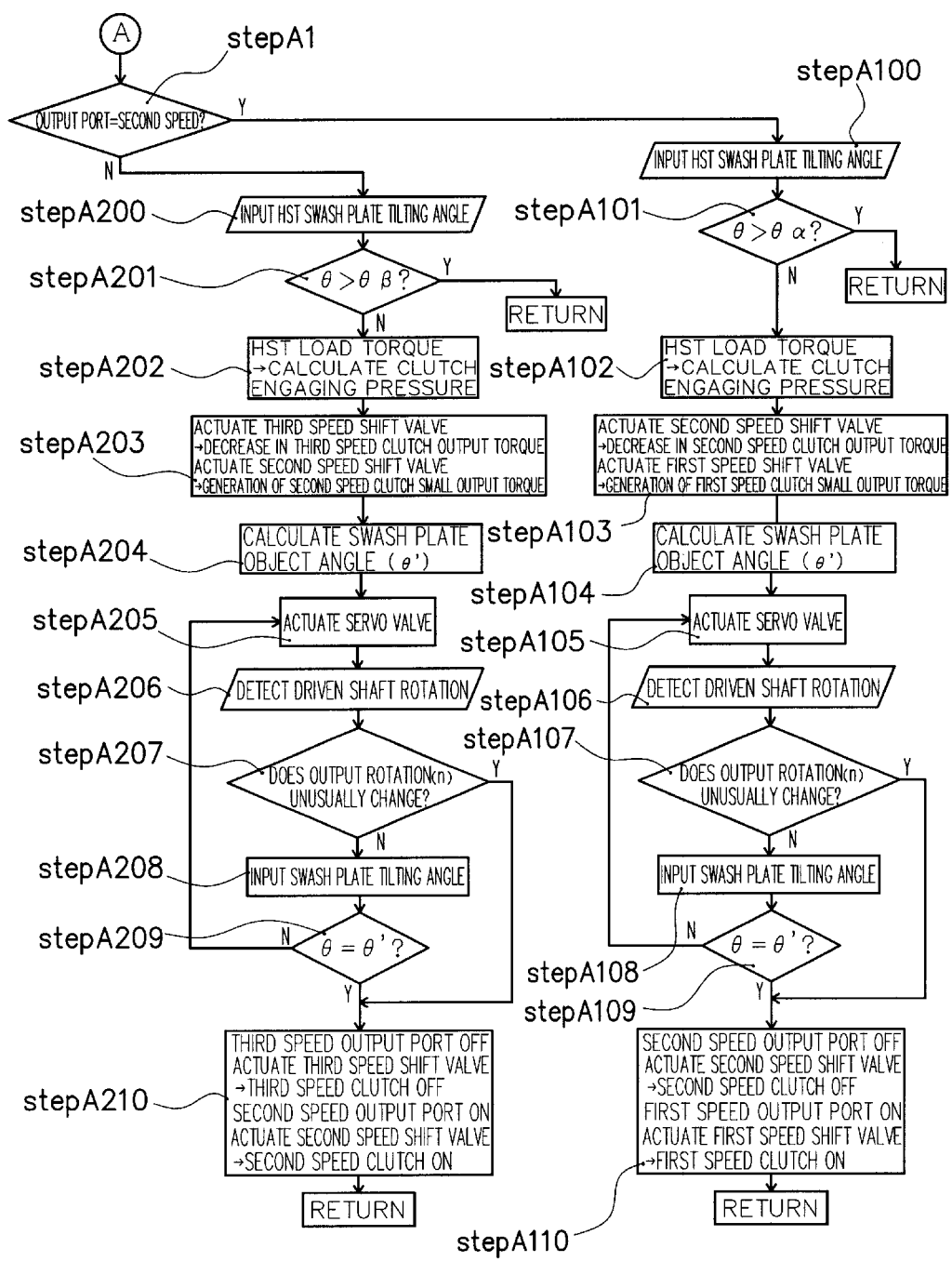
FIG. 9 is a control flow chart of sub-routine A in FIG. 8.
Figure 10:
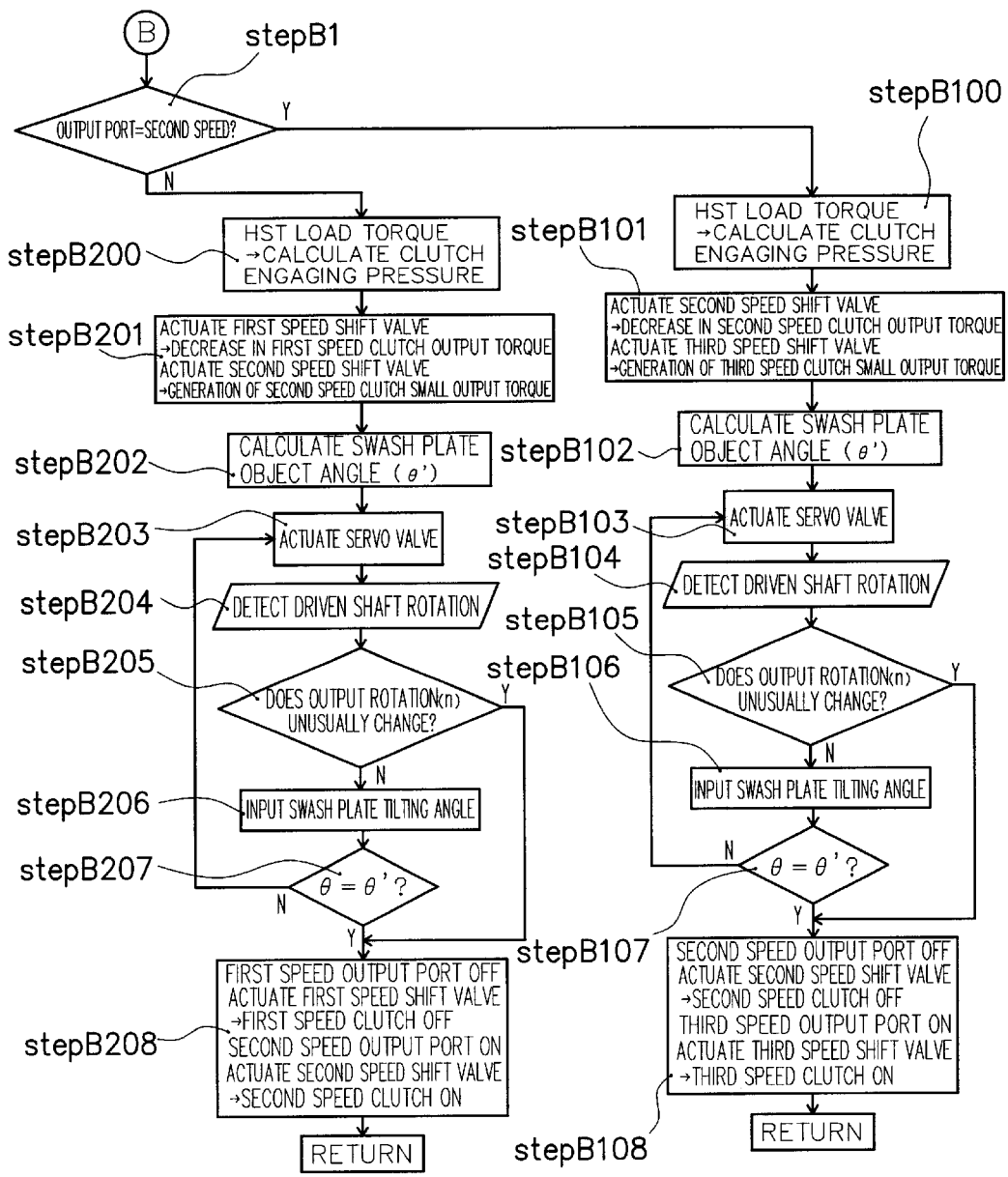
FIG. 10 is a control flow chart of sub-routine B in FIG. 8.

FIGS. 9 and 10 are respectively control flow charts of sub-routine A in FIG. 8, and sub-routine B in FIG. 8.

The control part 150 inputs the operation lever angle θx (step-1), and determines whether the operation lever 19 lies at the neutral (N) position (step-2). Where the operation lever is determined as lying at the neutral position, the mechanical transmission is brought into engagement with a reference speed stage (step-3). Specifically, the control part 150 outputs via an output port a signal enabling only the second-speed shift valve 83b to be positioned at an engaging position (see FIGS. 2 and 3).

Thus, it is possible to prevent an unintentional start of the vehicle since the mechanical transmission 60 is brought into the engaging state after confirming that the operation lever lies at the N position.

In this embodiment, the mechanical transmission has three speed stages with a second speed stage being designated as the reference speed stage to enable both the upshifting and downshifting from the reference speed stage.

The control part 150 then inputs a current operation lever angle θx again (step-4). When θx is not zero, or the operation lever is tilted in the positive rotation direction (F direction) or the negative rotation direction (R direction) (see FIG. 2) by the driver, the control part 150 advances to step-6.

On the other hand, where the operation lever angle θx is zero, or the operation lever lies at the N position, the control part 150 inputs the swash plate angle θ (step-50), and determines whether the swash plate 11b lies at the N position (step-51). Where the swash plate does not lie at the N position, the control part 150 actuates the servo valve 52b (step-52) to control the swash plate angle θ to zero. Thus, the N position respective to the operation lever 19 and the swash plate 11b is adjusted through steps-50 to -52.

Where the operation lever 19 has been determined as being tilted in either direction in step-5, the control part 150 recognizes a currently engaging speed stage of the mechanical transmission (step-6). The reason for recognizing again the engaging speed stage of the mechanical transmission in this step is that the mechanical transmission, which has been confirmed as being engaged with the reference speed stage (the second speed stage in this embodiment) at the time of vehicle start, may be shifted to a speed stage other than the second speed stage due to forcible upshifting or downshifting of the mechanical transmission after the steps hereinafter described have been performed.

The control part 150 then detects whether the load torque of the HST 10 lies within a proper range in steps-7 and -8. Specifically, the control part 150 determines based upon the signals from the load torque detection means 111 whether the hydraulic pressure (P) of the pair of hydraulic lines 20 of the HST 10 is above the reference level (Pb) of high pressure side (step-7), and whether it is below the reference level (Pa) of low pressure side.

Now, the description will be made for the respective cases where the hydraulic pressure (P) of the pair of hydraulic fluid lines are: (i) Pa≦P≦Pb (proper load torque state), (ii) P>Pb (high load torque state), and (iii) P≦Pa (low load torque state).

(i) Case: Pa≦P≦Pb (Proper Load Torque State)

In the proper load torque state, the control part 150 determines the respective matters as being "NO" in steps-7 and -8, it advances to step-9. In step-9, the control part 150 detects the rotation number of the driven shaft 232 of the mechanical transmission 60, and then determines whether the rotation number (n) of the driven shaft is zero in step-10.

Where n has been determined as n=0 in step-10, it is concluded that the swash plate 19b of the HST 10 is not tilted to such an extent as to enable the vehicle to start, and therefore the motor shaft 15a is not rotated. Accordingly, the control part 150 inputs the swash plate angle θ (step-11), and actuates the servo valve 52b to add a predetermined angle to the swash plate angle (step-12). In this embodiment, the predetermined angle to be added is set to "1°". Then, the control part 150 returns to step-4.

Specifically, steps-11 and -12 are provided to bring the vehicle from the stationary state to the travelling state. In this stage, the matching of the operation lever 19 to the angle of the swash plate 11b is not determined.

On the other hand, where n has been determined as n≠0, the control part 150 advances to step- 100, in which it inputs a current operation lever angle θx, and calculates a displacement angle Δθ of the operation lever (step-101). The displacement angle Δθ of the operation lever is obtained by storing at the RAM an operation lever angle θx', which is the angle just before the tilting operation, and calculating the difference between θx and θx'(θx−θx').

Where Δθθx=0, it is concluded that the operation lever has not been manipulated by the driver. Accordingly, the control part 150 does not control the swash plate, and returns to step-4. The control part 150 then repeats the same flow.

Where Δθx+0, it is concluded that the operation lever has been manipulated by the driver. Then, there causes a necessity to tilt the swash plate according to the operation angle of the operation lever. Accordingly, the control part 150 inputs a current swash plate angle θ (step-103), and actuates the servo valve 52b to control the swash plate angle to θx+Δθ (step-194). The swash plate 11b of the HST is thus tilted through an angle corresponding to the operation angle of the operation lever by the driver. The control part then returns to step-4, and repeats the same flow.

(ii) Case: P>Pb (High Load Torque State)

Where the hydraulic pressure of the pair of hydraulic lines 20 has been determined as lying in the high load torque state by the control part 150, it advances from step-7 to step-70 to detect whether the mechanical transmission 60 lies in a state enabling the shifting down, or is in engagement with the lowest speed stage. The reason for detecting whether the mechanical transmission is in engagement with the lowest speed stage is to determine whether the control part 150 is to return to step-4 or to move to the sub-routine A. Specifically, where the mechanical transmission is in the high load torque state, the mechanical transmission is required to be downshifted to obtain a larger driving torque. However, it is not possible to downshift the mechanical transmission in engagement with the lowest speed stage, or the first speed stage in this embodiment. Accordingly, where the mechanical transmission is in engagement with the first speed stage, the control part 150 simply returns to step-4. On the other hand, where the mechanical transmission 60 is not in engagement with the first speed stage, the control part 150 advances to the sub-routine A enabling the mechanical transmission 60 to be forcibly downshifted.

As illustrated in FIG. 9, the control part 150 detects a currently engaging speed stage of the mechanical transmission 60 in the sub-routine A (step-A1). In this embodiment, the mechanical transmission 60 has three speed stages. Accordingly, since it has already turned out in step-70 that the mechanical transmission 60 is not in engagement with the first speed stage, it is possible to detect which of the second and third speed stages is in engagement, merely by detecting whether the signal enabling the engagement of the second speed stage is being outputted via the output port. Where the mechanical transmission has four or more speed stages, additional determining steps are properly arranged.

Once the mechanical transmission has been determined as being in engagement with the second speed stage, the control part 150 advances to the flow of step-A100 and subsequent steps for downshifting from the second speed stage to the first speed stage.

The control part 150 first inputs a current swash plate angle $\theta$ in step-A100, and based upon the input level determines whether the downshifting is possible without causing the variation of the vehicle speed (step-A101).

The determination in step-A101 is performed by using the "vehicle-speed-to-swash-plate-angle-relationship" in each speed stage (see FIG. 5) of the mechanical transmission 60 stored in the memory 152, and a current swash plate angle $\theta$.

Specifically, it is possible to determine from the "vehicle-speed-to-swash-plate-angle-relationship" the maximum vehicle speed V1max obtained by the engagement with the first speed stage. During the engagement of the second speed stage, the swash plate angle $\theta$ $\alpha$ enabling the output of the vehicle speed corresponding to the maximum vehicle speed V1max obtained by the engagement with the first speed stage is calculated. That is, the downshifting from the second speed stage to the first speed stage with the swash plate angle $\theta$ exceeding $\theta\alpha$ causes variations of the vehicle speed.

The control part 150 thus determines whether the swash plate angle $\theta$ exceeds $\theta\alpha$ determined by the "vehicle-speed-to-swash-plate-angle-relationship", and thereby determines whether the downshifting from the second speed stage to the first speed stage can be accomplished without causing changes in vehicle speed.

Then, where a current swash plate angle $\theta$ exceeds $\theta\alpha$, the control part 150 returns from the sub-routine A to step-4 in FIG. 7 without downshifting of the mechanical transmission.

On the other hand, where a current swash plate angle $\theta$ is below $\theta\alpha$, the control part 150 calculates the switching condition adapted for the downshifting operation from the second speed stage to the first speed stage, based upon the "pressure-to-time-relationship" according to a current HST load torque among the "pressure-to-time-relationships" stored in the memory 152 (step-A102).

Figure 6:
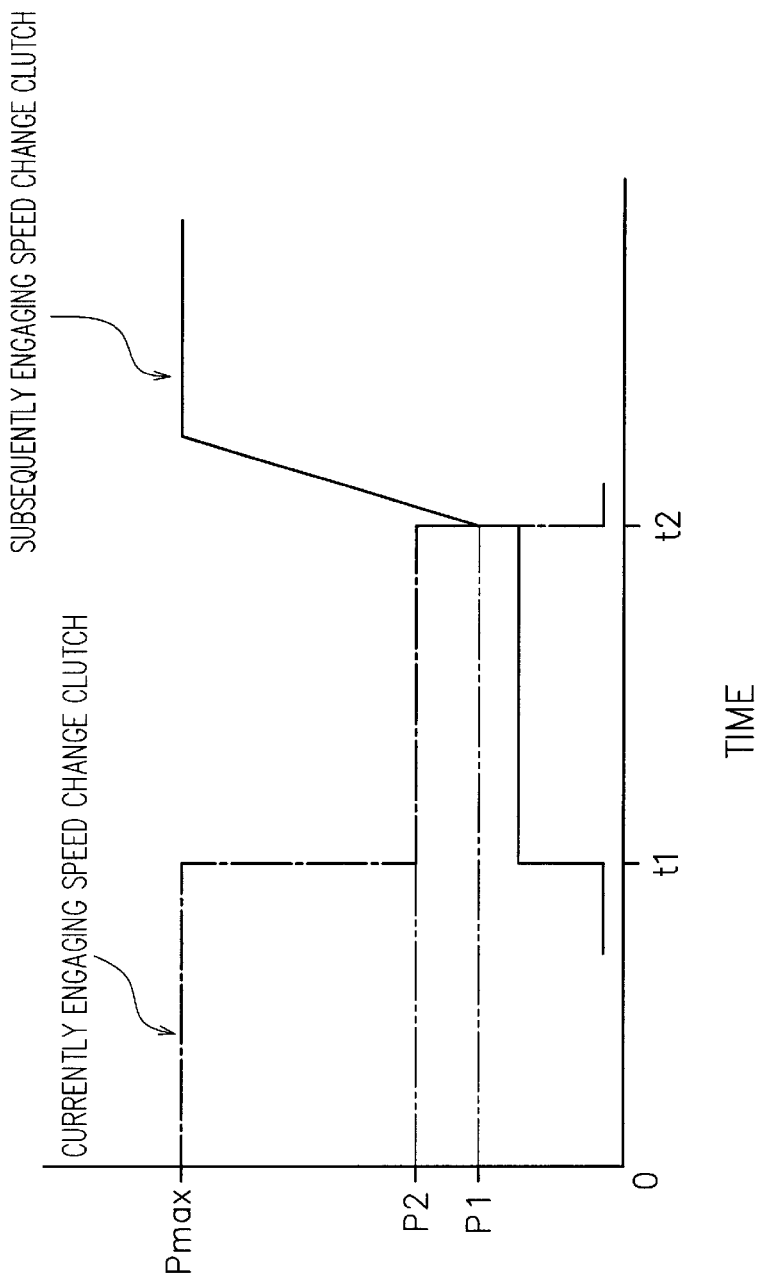
FIG. 6 is a graph showing the relationship between the hydraulic pressure in a speed-change line currently engaged and the hydraulic pressure in a speed-change line to be subsequently engaged, and a time period, which shows a shifting condition for the mechanical transmission.

Specifically, as illustrated in FIG. 6, the control part 150 causes the hydraulic pressure of the second-speed line 82b to drop from Pmax to P2 at time t1. P2 is set within a pressure range enabling the generation of a torque equal to that generated at Pmax. That is, P2 is set to a level on the condition that the hydraulic pressure of the second speed line 82b generates an engaging torque equal to that generated at Pmax. The reason for dropping the hydraulic pressure of the second speed line 82b to P2 is to limit as far as possible the time lag in switching action to a power shift device for the first speed stage.

On the other hand, the control part 150 causes the hydraulic pressure of the first speed line 82a to rise to such an extent not to enable the engagement with a power shift device for the first speed stage. This is to limit as far as possible the time lag in switching action to the power shift device for the first speed stage. Then, this state is kept until time t2.

At time t2, the hydraulic pressure of the second speed line 82b is lowered from P2, and the hydraulic pressure of the first speed line 82a is raised to P1, so that the power shift device for the second speed stage is brought out of the engaging state, while the power shift device for the first speed stage is brought into the engaging state.

It is possible to limit the variation of the output torque during the shifting of the mechanical transmission and hence accomplish the smooth shifting by respectively setting P2 and P1 to such levels as to match on a shaft 72 the engaging torque obtainable at P2 by the hydraulic pressure of the second speed line 82b with the engaging torque obtainable at P1 by the hydraulic pressure of the first speed line 82a.

The levels of P2 and P1 can be set according to a gear ratio in each speed stage of the mechanical transmission.

Subsequent to time t2, the hydraulic pressure of the first speed line 82a is gradually raised to Pmax, enabling the complete engagement of the power shift device for the first speed stage.

During the shifting of the mechanical transmission, the hydraulic pressure of the one speed-change line coupled to a currently engaging clutch device is lowered and kept in the pressure range enabling the generation of the engaging torque occurring at that time, and then the hydraulic pressure of the one speed-change line coupled to a clutch device to be subsequently engaged is raised to such a level as to match the aforesaid engaging torque with the engaging torque effected at the time of the shifting performed by a clutch device to be subsequently engaged, with the output shaft as reference. Thus, the smooth shifting of the mechanical transmission can be accomplished.

The control part 150 controls the actuation of the first-speed shift valve 83a and the second-speed shift valve 83b based upon the aforesaid switching condition (step-A103).

The control part 150 then calculates the target angle $\theta'$ of the swash plate 11b (step-A104). In other words, it calculates the angular position at which the swash plate 11b to be forcibly tilted is positioned. The calculation of the target angle $\theta'$ will be made as described below.

First, a current vehicle speed V is calculated based upon the swash plate angle $\theta$ inputted in step-A100 and the data concerning the second speed stage engaging state among the "vehicle-speed-to-swash-plate-angle-relationships" stored in the memory 152 (see FIG. 5). Then, the swash plate angle $\theta'$ at which the vehicle speed V is obtainable during the engagement with the first speed stage is calculated based upon the vehicle speed V and the data concerning the first speed stage engaging state among the "vehicle-speed-to-swash-plate-angle-relationships".

The control part 150 then actuates the servo valve 52b to tilt the swash plate 11b towards the target angle $\theta'$ (step-A105). At this time (i.e., an arbitrary time point from time t1 to time t2 in FIG. 6), the control part 150 inputs the rotation number (n) of the driven shaft 232 prior to determining the matching of the swash plate angles θ and angles θ'(step-A106), and determines whether the rotation number (n) of the driven shaft 232 is unusually varied (step-A107). The reason for detecting in advance the unusual variation of the rotation number (n) of the driven shaft 232 will be described below.

That is, where the power transmission has not been properly accomplished due to some reason, resulting in the slippage of the wheels of the vehicle on a slope or the like in the course of the shifting of the mechanical transmission (60) (i.e., a time period extending from time t1 to time t2 in FIG. 6), such wheel slippage can be prevented by shutting off the power shift device 70b for the second speed stage and engaging the power shift device 70a for the first speed stage prior to matching the swash plate angle θ to the target angle θ'.

Accordingly, where the control part 150 has determined that the unusual variation is occurring in the rotation number (n) of the driven shaft 232, it immediately advances from step-A107 to step-A110 to bring the power shift device 70b for the first speed stage into the engaging state.

On the other hand, where no unusual variations in the rotation number (n) of the driven shaft 232 has been detected, the control part 150 inputs the swash plate angle θ at that time (step-A108), and then actuates the servo valve 52b to match θ with θ (step-A109).

Once detecting the swash plate angle θ matched to the target angle θ' (step-A110), the control part 150 completes the downshifting from the power shift device 70b for the second speed stage to the power shift device for the first speed stage. Specifically, the point at which the control part 150 starts to perform step-A110 corresponds to time t2 in FIG. 6.

After the completion of the shifting operation, the control part 150 returns from the sub-routine A to step-4 in FIG. 7.

Where the mechanical transmission 60 is in engagement with the third speed stage, the control part 150 advances from step-A1 to step-A200, and in the flow of step-A200 to step-A220 performs the same controlling operations as those performed in the flow of step-A100 to step-A110.

As described above, the control part 150 increases the driving torque through the automatic downshifting of the mechanical transmission from a currently engaging speed stage to a lower speed stage, and in association with this downshifting operation controls the HST 10 to automatically shift to a vehicle speed increasing side, thereby preventing the variation of the vehicle speed due to the automatic downshifting of the mechanical transmission 60.

(iii) Case: P<Pa (Low Load Torque State)

Once the hydraulic pressure of the pair of hydraulic lines 20 has been determined as lying in the low load torque state, the control part 150 advances from step-8 to step-80, in which the control part 150 detects whether the mechanical transmission 60 lies in a state enabling the upshifting, or the mechanical transmission 60 is in engagement with the maximum speed stage. That is, it detects whether the mechanical transmission 60 is in engagement with the third speed stage. Where the mechanical transmission 60 is in engagement with the third speed stage, the control part 150 simply returns to step-4.

On the other hand, where the mechanical transmission 60 is not in engagement with the third speed stage, the control part 150 advances to the sub-routine B enabling the forcible upshifting of the mechanical transmission 60.

As illustrated in FIG. 10, the control part 150 detects a currently engaging speed stage of the mechanical transmission 60 (step-B1). In this embodiment, the mechanical transmission has three speed stages. Accordingly, since it has already turned out in step-70 that the mechanical transmission 60 is not in engagement with the third speed stage, it is possible to detect which of the first and second speed stages is in engagement, merely by detecting whether the signal enabling the engagement of the second speed stage is being outputted via the output port. Where the mechanical transmission has four or more speed stages, additional determining steps are properly arranged.

Once the mechanical transmission has been determined as being in engagement with the second speed stage, the control part 150 advances to the flow of step-B100 and subsequent steps for upshifting from the second speed stage to the third speed stage.

The control part 150 then calculates the switching condition adapted for the upshifting operation from the second speed stage to the third speed stage based upon the "pressure-to-time-relationship" corresponding to a current HST load torque, among the "pressure-to-time-relationships" stored in the memory 152 (step-B100).

The control part 150 then controls the actuation of the second-speed shift valve 83b and the third-speed shift valve 83c according to the switching condition (step-B101). A specific control procedure is the same as that of the sub-routine A.

The control part 150 then calculates the target angle θ' of the swash plate 11b (step-B102). Specifically, it calculates the angular position at which the swash plate 11b to be forcibly tilted is positioned. The calculation of the target angle θ' is made in the same manner as in the sub-routine A.

The control part 150 then actuates the servo valve 52b to tilt the swash plate 11b towards the target angle θ' (step-B103). At this point (i.e., an arbitrary point from time t1 to time t2 in FIG. 6), the control part 150 inputs the rotation number (n) of the driven shaft 232 prior to determining the matching of the swash plate angle θ to the target angle θ', and then determines whether the rotation number (n) of the driven shaft 232 is unusually varied (step-B105).

Where the control part 150 has determined that the unusual variation is occurring in the rotation number (n) of the driven shaft 232, it immediately advances from step-B105 to step-B108 to bring the power shift device 70c for the third speed stage into the engaging stage.

On the other hand, where no unusual variations in the rotation number (n) of the driven shaft 232 has been detected, the control part 150 inputs the swash plate angle θ at that point (step-B106), and then actuates the servo valve 52b to match the swash plate angle θ to the target angle θ' (step-B107).

Once detecting the swash plate angle θ matched to the target angle θ' (step-B108), the control part 150 completes the upshifting from the power shift device 70b for the second speed stage to the power shift device 70c for the third speed stage. Specifically, the point at which the control part 150 starts to perform step-B108 corresponds to time t2 in FIG. 6.

After the completion of the shifting operation, the control part 150 returns from the sub-routine A to step-4 in FIG. 7.

Where the mechanical transmission 60 is in engagement with the third speed stage, the control part 150 advances from step-B1 to step-B200, and in the flow of step-B200 to step-B208 performs the same controlling operations as those performed in the flow of step-B100 to step-B108.

As described above, in the low load torque state, the control part 150 adapts the mechanical transmission to a state enabling the high-speed travelling by the automatic upshifting of the mechanical transmission from a currently engaging speed stage to a higher speed stage, and in association with this upshifting operation controls the HST 10 to automatically shift to a vehicle speed decreasing side, thereby preventing the variation of the vehicle speed due to the automatic upshifting of the mechanical transmission 60.

FIGS. 11 and 12 illustrate graphs respectively showing various relationships between the HST swash plate angle and the vehicle speed in the travelling control apparatus according to the present invention.

Figure 11B:
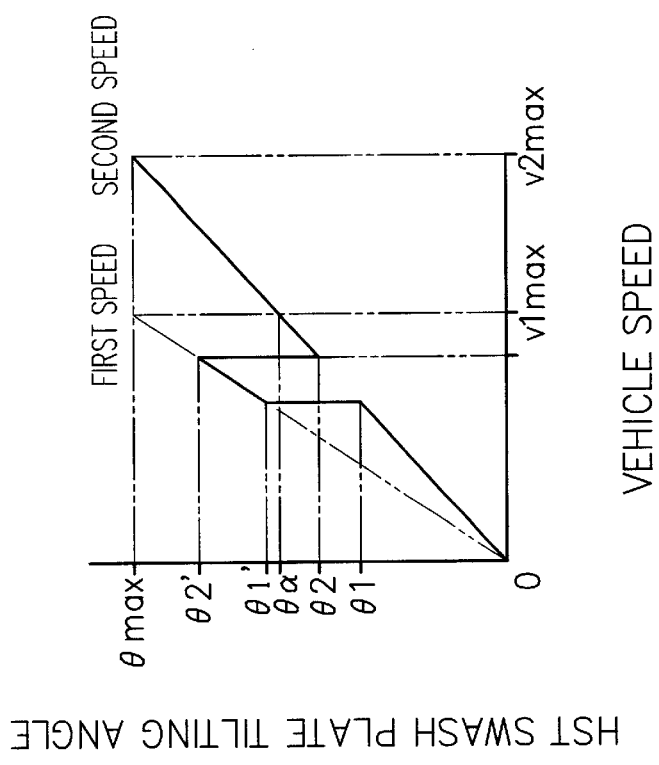
FIGS. 11A and 11B are graphs showing the relationship between the HST swash plate tilting angle and the vehicle speed, respectively during an automatic downshifting operation of the mechanical transmission from the second speed stage to the first speed stage, a successive automatic downshifting and upshifting operation, namely downshifting from the second speed stage to the first speed stage, and then upshifting from the first speed stage to the second speed stage.
Figure 11A:
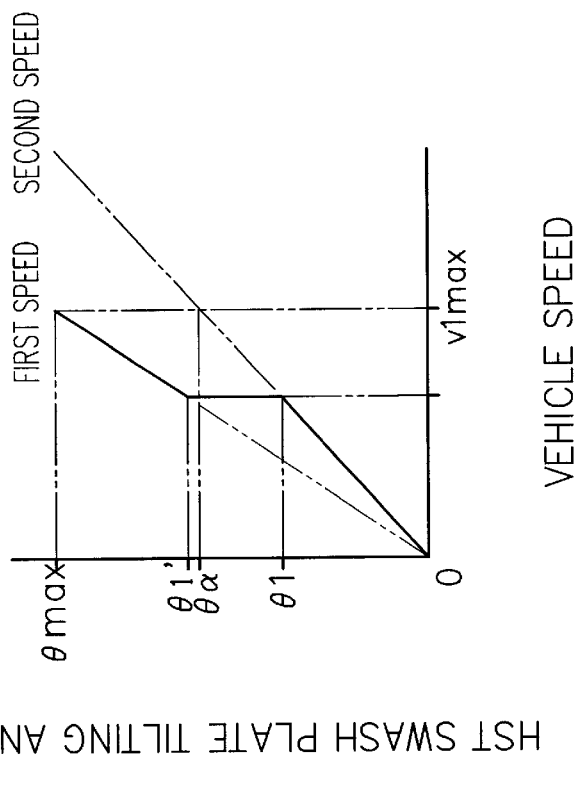

FIGS. 11A and 11B are graphs respectively representing the case where the mechanical transmission 60 was automatically downshifted from the second speed stage to the first speed stage, and the case where it was automatically downshifted from the second speed stage to the first speed stage, and then upshifted from the first speed stage to the second speed stage.

Figure 12A:
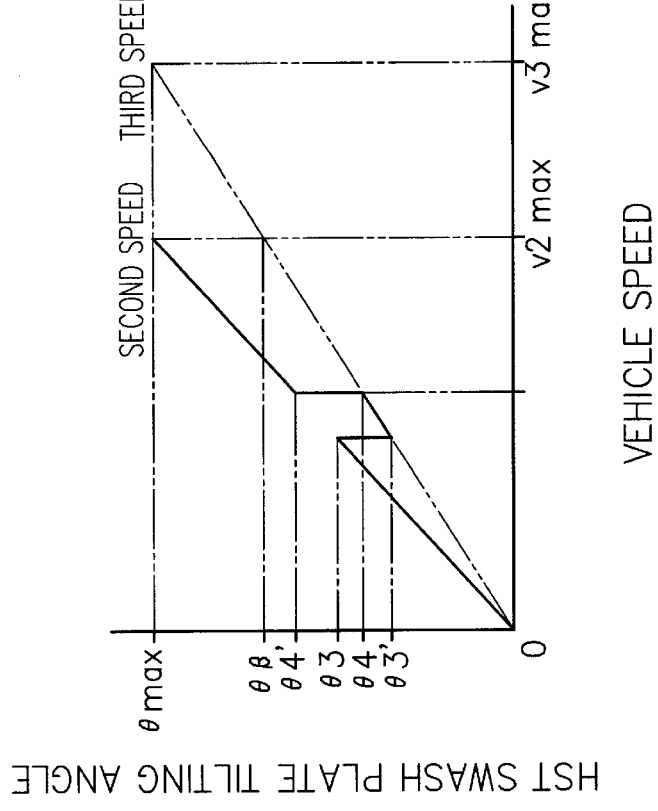
FIGS. 12A and 12B are graphs showing the relationship between the HST swash plate tilting angle and the vehicle speed, respectively during an automatic upshifting operation of the mechanical transmission from the second speed stage to the third speed stage, and a successive automatic shifting operation, namely downshifting from the second speed stage to the third speed stage, and then upshifting to the second speed stage therefrom.
Figure 12B:
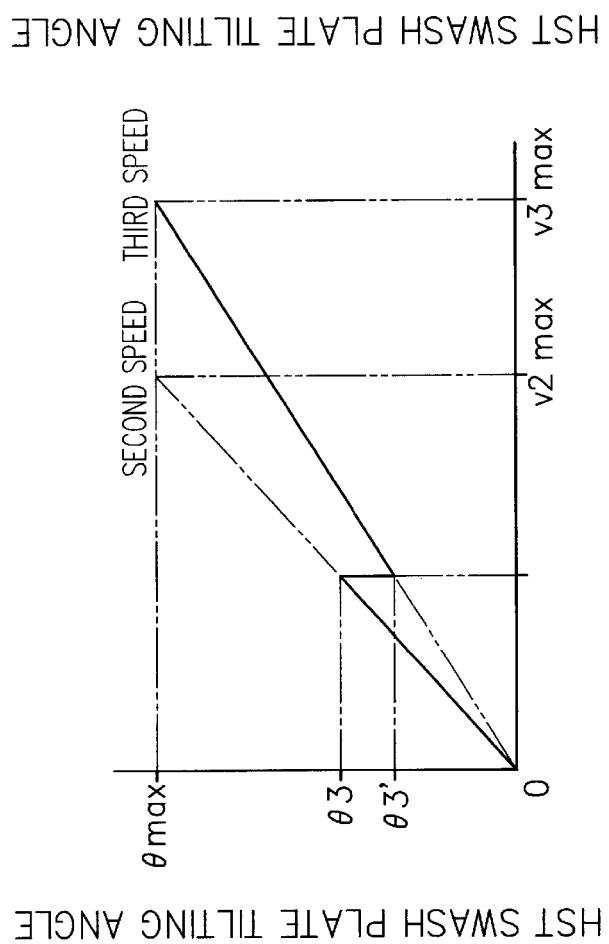

FIGS. 12A and 12B are graphs respectively representing the case where the mechanical transmission 60 was automatically upshifted from the second speed stage to the third speed stage (second→third), and the case where the mechanical transmission was automatically upshifted from the second speed stage to the third speed stage, and then automatically downshifted from the third speed stage to the second speed stage (second→third→second).

V1max, V2max and V3max in FIGS. 11 and 12 represent the respective maximum vehicle speeds with the mechanical transmission in engagement with the first speed stage, the second speed stage and the third speed stage.

As illustrated in FIG. 11A, where the mechanical transmission 60 has been determined as being in the high load torque state during the engagement with the second speed stage, it is automatically downshifted to the first speed stage, while the swash plate of the HST 10 is automatically tilted from θ1 to θ1', thereby increasing the output speed of the HST. As a result, the variation of the vehicle speed due to the shifting operation of the mechanical transmission is limited.

Where the mechanical transmission 60 has been determined as being in the low load torque state during the vehicle travels with the first speed stage engaged, as illustrated in FIG. 11B, it is automatically upshifted from the first speed stage to the second speed stage, while the swash plate of the HST is automatically tilted from θ2' to θ2, thereby decreasing the output speed of the HST. As a result, the variation of the vehicle speed due to the shifting operation of the mechanical transmission is limited. θα in FIGS. 11A and 11B represents the upper limit of the swash plate angle enabling the downshifting from the second speed stage to the first speed stage without causing the variation of the vehicle speed.

Similarly, where the mechanical transmission has been determined as lying in the low load state during the engagement with the second speed stage, as illustrated in FIG. 12A, the mechanical transmission 60 is automatically upshifted to the third speed stage, while the swash plate of the HST 10 is automatically tilted from θ3 to θ3', thereby decreasing the output speed of the HST. As a result, the variation of the vehicle speed due to the shifting operation of the mechanical transmission is limited.

Where the mechanical transmission has been determined as lying in the high load state during the vehicle travels with the third speed stage engaged, as illustrated in FIG. 12B, the mechanical transmission 60 is automatically downshifted from the third speed stage to the second speed stage, while the swash plate of the HST 10 is automatically tilted from θ4 to θ4', thereby increasing the output speed of the HST. As a result, the variation of the vehicle speed due to the shifting operation of the mechanical transmission is limited. θβ in FIGS. 12A and 12B represents the upper limit of the swash plate angle enabling the downshifting from the third speed stage to the second speed stage without causing the variation of the vehicle speed.

In addition to various desirable effects as described above, the travelling control apparatus according to this embodiment provides the following effects.

In the vehicle with the HST and the mechanical transmission connected in tandem thereto, which are interposed in the travelling power transmission path between the driving power source and the driving wheels, the travelling control apparatus includes the speed-change control mechanism with the signal detection part and the control part to control the changing of the output speed of the HST and the shifting operation of the mechanical transmission. The signal detection part in turn includes the load-torque detection means for detecting the load torque to the vehicle. The control part is designed to control the mechanical transmission and the HST based upon the detected results by the load-torque detection means. Specifically, where the vehicle lies in the high load torque state, the control part downshifts the mechanical transmission to a lower speed stage, while increasing the output speed of the HST. Thus, it is possible to obtain a large driving torque through the automatic downshifting of the mechanical transmission in the high load torque state, while limiting the variation of the vehicle speed due to the downshifting operation of the mechanical transmission.

The control part is also designed to control the mechanical transmission and the HST based upon the results detected by the load-torque detection means in such a manner as to upshift the mechanical transmission to a higher speed stage while decreasing the output speed of the HST where the vehicle lies in the low load torque state. Thus, it is possible to enable the high-speed travelling through the automatic upshifting of the mechanical transmission, while limiting the variation of the vehicle speed due to the upshifting operation of the mechanical transmission.

An additional desirable effect can be provided by the travelling control apparatus having the additional arrangement described above.

Specifically, the signal detection part includes the swash-plate-angle detection means for detecting the swash plate angle of the HST and the lever-pivoting-angle detection means for detecting the pivoting angle of the operation lever designed to manually control the swash plate. The memory of the control part stores data concerning the relationship between the swash plate angle and the vehicle speed, or the vehicle-speed-to-swash-plate-angle-relationship in each speed stage engaged of the mechanical transmission. The processor of the control part detects a current vehicle speed based upon the vehicle-speed-to-swash-plate-angle-relationship in a currently engaging speed stage of the mechanical transmission by using the swash plate angle inputted from the swash-plate-angle detection means, and then determines based upon the vehicle-speed-to-swash-plate-angle-relationship in a speed stage of the mechanical transmission to be subsequently engaged by using the detected vehicle speed whether the mechanical transmission lies in a state enabling its shifting operation. Thus, it is possible to effectively prevent a relatively wide variation of the vehicle speed due to the shifting operation of the mechanical transmission.

Once the processor has determined that the shifting operation of the mechanical transmission can be performed, it controls the swash plate based upon the vehicle-speed-to-swash-plate-angle-relationship in a speed stage of the mechanical transmission to be subsequently engaged, by using the detected vehicle speed. Thus, it is possible to limit the variation of the vehicle speed at the time of the shifting operation of the mechanical transmission.

Embodiment 2

Figure 13:
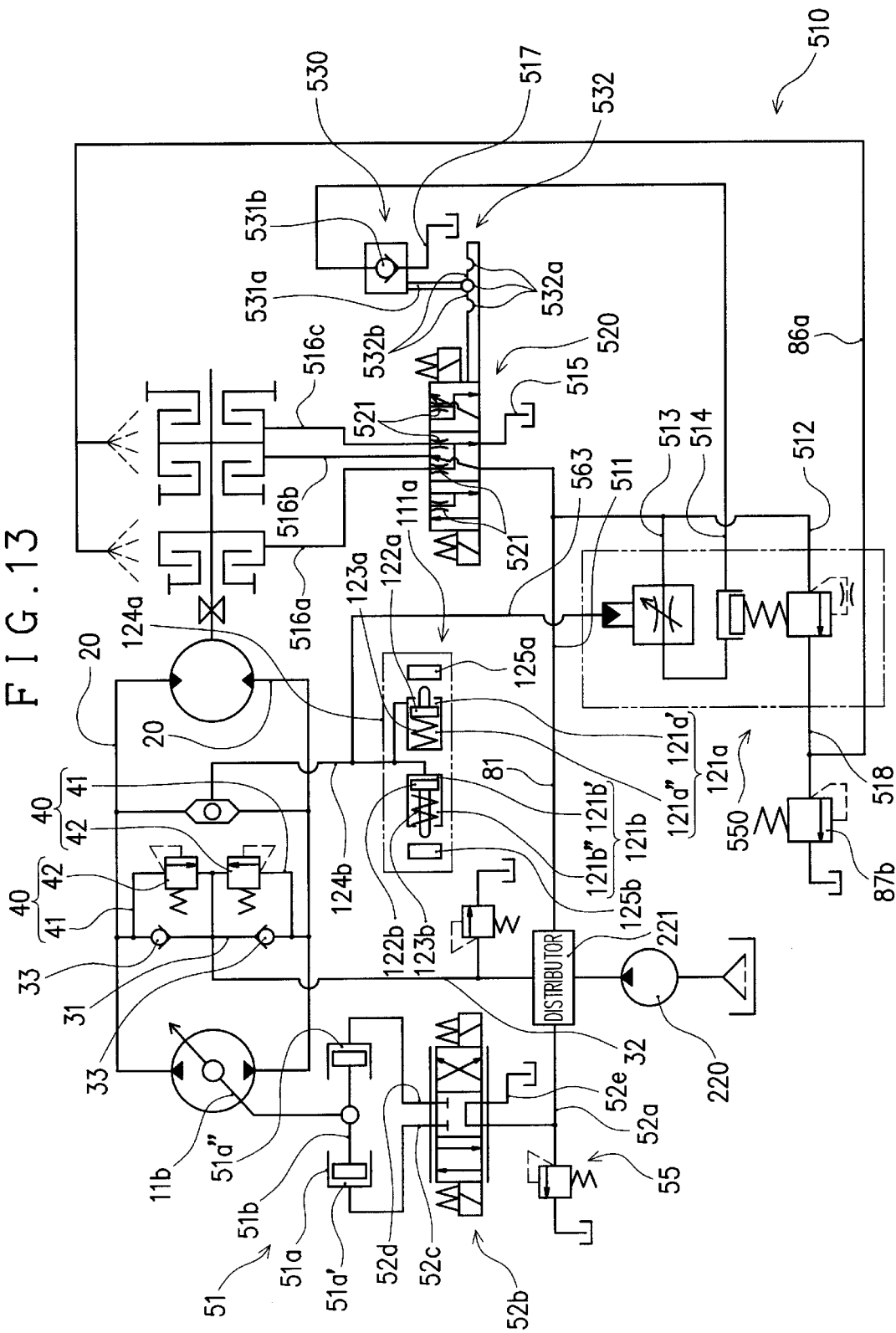
FIG. 13 is a hydraulic circuit diagram of the vehicle travelling control apparatus according to another embodiment of the present invention.

The description will hereinafter be made for another preferred embodiment of the travelling control apparatus according to the present invention with reference to the appended drawings. FIG. 13 is a model view of the power transmission path of the vehicle to which the vehicle travelling control apparatus of this embodiment is applied. In the following description, corresponding or identical parts to those of the first embodiment have been given the same reference characters to omit a detailed description thereof.

In the first embodiment, the hydraulic control of the mechanical transmission during the shifting operation is electrically performed based upon the switching condition stored in the memory 152. In this embodiment, this hydraulic control is hydraulically performed according to the load torque applied to the vehicle.

Specifically, the load torque applied to the vehicle (travelling resistance) during the vehicle travels is not constant, but varies depending on a condition as to whether the vehicle is at work, as well as the size of a load carried by the vehicle, road condition, and the like. For example, where the vehicle is driving over a flat paved road, the load torque applied to the vehicle is relatively small. On the other hand, where the vehicle is driving over an uphill slope or unpaved road, or the vehicle is a service vehicle that keeps a service operation during it travels, the high load torque is applied to the vehicle.

Where the hydraulic mechanical transmission is shifted to a different speed stage under this high load torque state, there may occur a relatively wide variation of the vehicle speed due to the shifting operation, and hence slipping out of the wheels, engine stalling or any other undesirable results in some cases, unless the hydraulic pressure of the working fluid fed to a subsequently engaging clutch device is raised to a level enabling the clutch engaging and hence the transmission of the driving power.

Under the high load torque state, there may also occur an inefficient transmission of the driving power due to the slippage of the clutch devices, unless the hydraulic pressure of the working fluid fed to a subsequently engaging clutch device is raised when switching to this clutch device.

This embodiment has been made in consideration of the above problems. Specifically, the hydraulic pressure of the working fluid fed to the mechanical transmission 60 for each switching operation of the power shift devices 70 of the mechanical transmission 60 is controllable according to the load applied to the vehicle.

More specifically, the travelling control apparatus of this embodiment includes a hydraulic-pressure control mechanism 500 in place of the speed-change operation mechanism 80.

The hydraulic-pressure control mechanism 500 includes a working fluid feeding hydraulic circuit 510 acting as a feeding passage of the working fluid to the power shift device 70, and a delay relief valve 550 disposed within the hydraulic circuit.

The working fluid feeding hydraulic circuit 510 includes a charge line 511 for partially receiving the pressurized hydraulic fluid flowing from the charge pump 220 via the distributor 221, a hydraulic pressure setting line 512 having a first end communicating with the charge line 511, a first hydraulic pressure controlling line 513 having a first end communicating with the charge line 511, a second hydraulic pressure controlling line 514 having a first end communicating with the delay relief valve 550, a drain line 518 adapted to selectively communicate with the hydraulic pressure setting line 512 in response to the motion of the delay relief valve 550, a selector valve 520 having an input side to which a rear end of the charge line 511 is connected, a drain line 515 connected to the selector valve 520, first to third speed lines 516a, 516b, 516c respectively connected between an output side of the selector valve 520 and the power shift devices 70a to 70c, and a releasing mechanism 530 for communication/shutdown of the second hydraulic pressure controlling line 514 with respect to the drain line 517 in response to the shifting of the selector valve 520.

The selector valve 520 is of a electromagnetically switchable type that is adapted to move from the second speed engaging position to the first speed engaging position or the third speed engaging position based upon the signals from the control part 150. In FIG. 13, the selector valve is illustrated as taking the second speed engaging position.

The releasing mechanism 530 includes a check valve 531b with a push pin 531a disposed in the second hydraulic pressure controlling line 514. With this arrangement, the second hydraulic pressure controlling line 514 is brought into communication with the drain line 517 by pressing the push pin 531a towards the check valve 531b.

The push pin 531a is regularly biased away from the check valve 531b, enabling the second hydraulic line controlling line 514 to communicate with the drain line 517 only in the case that the push pin 531a is pressed towards the check valve 531b.

The releasing mechanism 530 includes a pressing member 532 for timely pressing the push pin 51a according to the position of the selector valve 520. Specifically, the pressing member 532 forms thereon three recesses 532a located corresponding to the positions with which the selector valve 520 engages, and a protrusion 532b adapted to the moving state of the selector valve from one engaging position to a different engaging position, so that the push pin 531a is not pressed where the selector valve 520 is positioned at either one of the engaging positions, while it is pressed only during the movement of the selector valve 520 from one engaging position to an adjacent engaging position.

The description will now be made for the hydraulic state of the working fluid feeding hydraulic circuit 510 subjected to the movement of the selector valve 520, by taking for example the cases, namely where the selector valve 520: (i) is positioned at the second speed stage engaging position, (ii) is moving from the second speed stage engaging position to the third speed engaging position, and (iii) is positioned at the third speed stage engaging position.

Case (i) where the selector valve is positioned at the second speed stage engaging position (i.e., the positional state as illustrated in FIG. 13):

The second speed line 516b is communicated with the charge line 511, while the first speed line 516a and the third speed line 516c are communicated with the drain line 515 via a throttle valve 521 disposed in the circuit of the selector valve 520. On the other hand, where the selector valve 520 is positioned at either one of the engaging positions, the second hydraulic pressure controlling line 514 is closed as described above. Accordingly, where the selector valve 520 is positioned at the second speed stage engaging position, the hydraulic pressure of the second speed line 516b is raised to a level set by the delay relief valve 550 as time elapses, and kept at the set pressure level.

Case (ii) where the selector valve is moving from the second speed engaging position to the third speed engaging position:

As described above, during the movement of the selector valve 520, the second hydraulic pressure controlling line 514 is communicated with the drain line 517 by means of the releasing mechanism 530. Accordingly, the hydraulic pressure of the hydraulic line on the input side of the selector valve 520, specifically, the hydraulic pressure of the second hydraulic pressure controlling line 514, the first hydraulic pressure controlling line 513, the hydraulic pressure setting line 512 and the charge line 511 is lowered to a level as initially set. On the other hand, the second speed line 516*b* is brought into a closing state. so that its hydraulic pressure is kept at the aforesaid set level.

Case (iii) where the selector valve is positioned at the third speed stage engaging position:

The first speed line 516*a* is communicated with the drain line 115, while the second speed line 516*b* and the third speed line 516*c* are respectively communicated with the drain line 515 via the throttle valve 521, and with the charge line 511. On the other hand, where the selector valve 520 is positioned at the one engaging position, the second hydraulic pressure controlling line 514 is closed, as described above. Accordingly, where the selector valve 520 is positioned at the second speed stage engaging position, the hydraulic pressure of the third speed line 516*c* is raised to a level set by the delay relief valve 550 as time elapses, and kept at the set level. The hydraulic pressure of the second speed line 116*b* is gradually lowered by the throttle valve 521.

Figure 14:
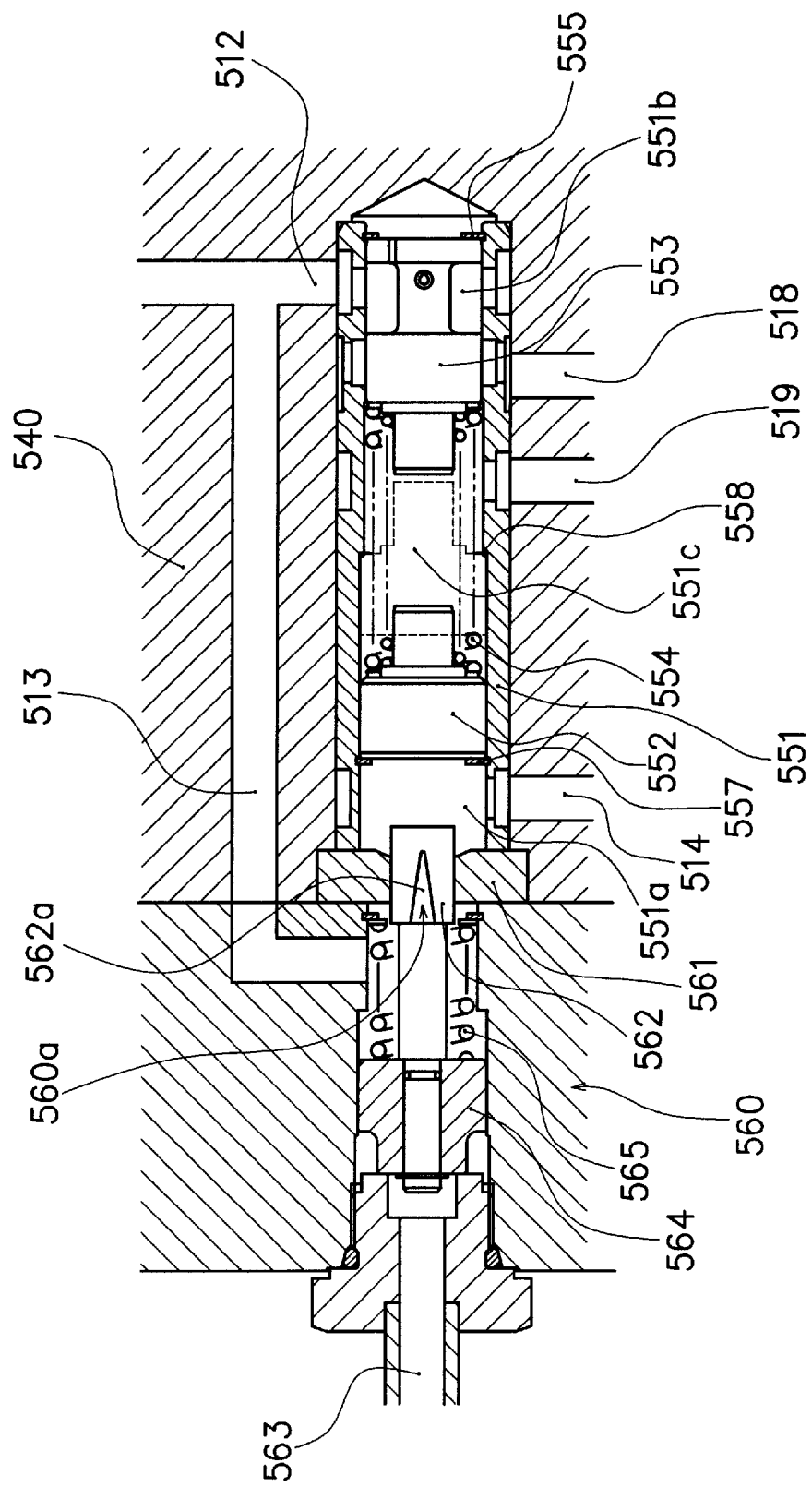
FIG. 14 is a longitudinal cross section of a delay relief valve in the travelling control apparatus illustrated in FIG. 13, showing a low load torque state where the load torque relative to the vehicle is low.
Figure 15:
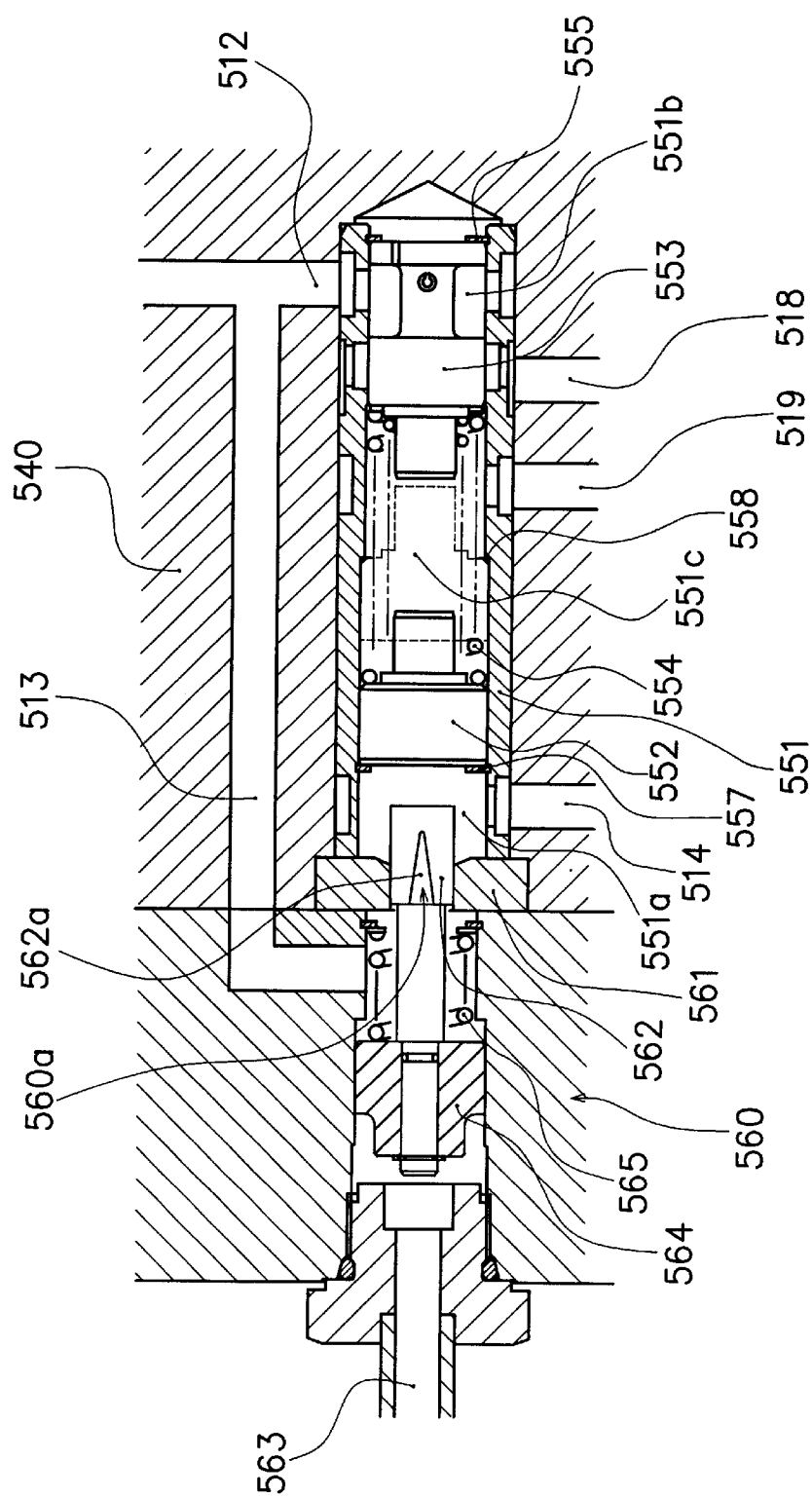
FIG. 15 is a longitudinal cross section of the delay relief valve of FIG. 14 in a medium load torque state where the load torque relative to the vehicle is medium.
Figure 16:
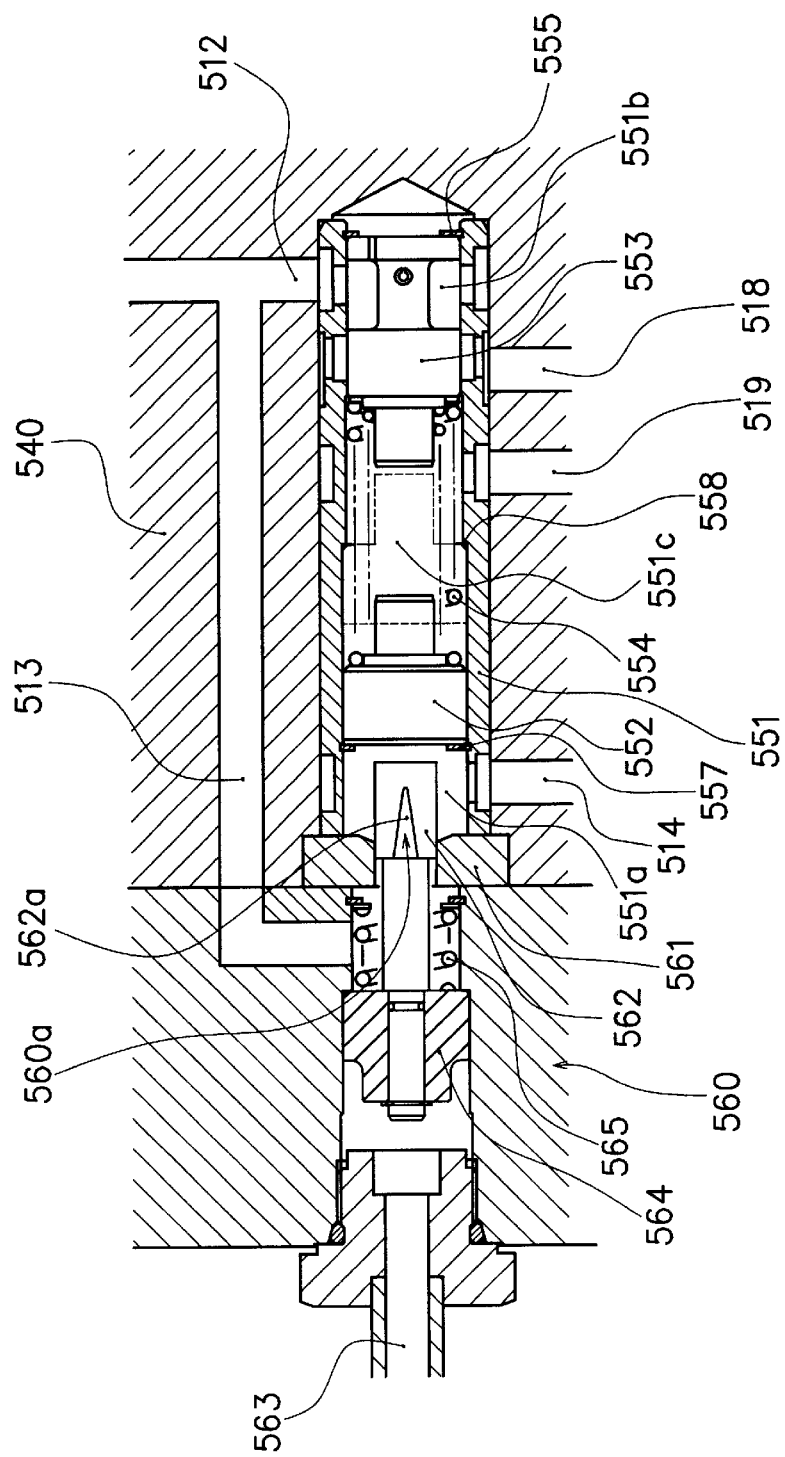
FIG. 16 is a longitudinal cross section of the delay relief valve of FIG. 14 in a high load torque state where the load torque relative to the vehicle is high.

The description will now be made for the delay relief valve 550. FIGS. 14 to 16 respectively illustrate longitudinal cross sections of the delay relief valve 550 and its periphery, and more specifically they respectively illustrate the cross sections of the delay relief valve in various load torque states with respect to the vehicle, namely in the low load torque state, medium load torque state and high load torque state.

As illustrated in FIGS. 14 to 16, the delay relief valve 550 includes a sleeve 551 mounted within a valve casing 540, a control piston 552 axially sidably disposed within the sleeve 551 in such a manner as to define at a first side of the sleeve 551 a hydraulic pressure controlling chamber 551*a* communicating with the first hydraulic pressure controlling line 513 and the second hydraulic pressure controlling line 514, a valve 553 axially sidably disposed within the sleeve 551 in such a manner as to define at a second side of the sleeve a hydraulic pressure setting chamber 551*b* communicating with the hydraulic pressure setting line 512 and adapted to be selectively communicated with or shut off to the drain line 518, a hydraulic pressure setting spring 554 disposed within a spring chamber 551*c* between the control piston 552 and the valve 553 of the sleeve in such a manner as to have a first end held on the control piston 552 and a second end held on the valve 553, and a throttle-opening control mechanism 560 for adjusting the diameter of a throttle aperture 560*a* adapted to regulate, according to the load torque with respect to the vehicle, the amount of the working fluid fed from the first hydraulic fluid controlling line 513 to the hydraulic pressure controlling chamber 551*a*.

The description will now be made for the function of the delay relief valve 550 by taking for example the case where the selector valve 520 is moved from the first speed stage engaging position to the second speed stage engaging position.

As described above, where the selector valve 520 is positioned at the first speed stage engaging position, the charge line 511 is communicated with the first speed line 516*a*, while the second hydraulic pressure controlling line 514 is closed. Accordingly, the hydraulic pressure of the hydraulic pressure setting chamber 551*b* communicating with the hydraulic pressure setting line 512 is raised to a higher pressure, so that the valve 553 is pressed towards the spring chamber 551*c* against the biasing force of the hydraulic pressure setting spring 554. Once the valve 553 is pressed towards the spring chamber 551*c* through a predetermined length, the hydraulic pressure setting chamber 551*b* is brought into communication with the drain line 518. In the relevant Figures, a reference numeral 519 represents a drain line for opening the spring chamber 551*c*.

Once the hydraulic pressure setting chamber 551*b* is communicated with the drain line 518 for the hydraulic pressure setting, the hydraulic pressure in the hydraulic pressure setting chamber 551*b* is lowered. Accordingly, the hydraulic pressure setting spring 551*c* presses the valve 553 back towards the hydraulic pressure setting chamber 551*b* so that the hydraulic pressure setting chamber 551*b* is shut off to the drain line 518. Thus, the hydraulic pressure of the hydraulic circuit is again raised. A terminal point of the valve 553 at the side of the hydraulic pressure setting chamber 551*b* is defined by a ring member 555 mounted on an inner periphery of the sleeve 551.

Thus, the working fluid feeding hydraulic circuit 510 is kept at a preset level which is determined by the biasing force of the hydraulic pressure setting spring 554.

The selector valve 520 under this state is moved from the second speed stage engaging position to the third speed stage engaging position. During this movement of the selector valve 520, the hydraulic pressure of the second hydraulic pressure controlling line 514, the first hydraulic pressure controlling line 513, the hydraulic pressure setting line 512 and the charge line 511 is once lowered to the initial hydraulic pressure level.

Whereby, the hydraulic pressure of the hydraulic pressure controlling chamber 551*a* communicated with the first hydraulic pressure controlling line 513 and the second hydraulic pressure controlling line 514 is lowered to the initial hydraulic pressure level. Accordingly, the control piston 552 is pressed towards the hydraulic pressure controlling chamber 551*a* by the biasing force of the hydraulic pressure setting spring 554, and then positioned at a stop position closer to the hydraulic pressure controlling chamber 551*a* (hereinafter referred to the initial hydraulic pressure position) as illustrated in solid line in FIGS. 14 to 16. In this embodiment, the initial hydraulic pressure position is defined by a ring member 552.

The selector valve 520 is then positioned at the third speed stage engaging position, so that the second hydraulic pressure controlling line 514 is closed, while the charge line 511 is communicated with the third speed line 516*c*. Accordingly, the hydraulic pressure of the third speed line 516*c* communicated with the clutch device 71*c* for the third speed stage to be subsequently engaged starts to rise.

At this moment, the control piston 552 defining the hydraulic pressure controlling chamber 551*a* communicated with the first hydraulic pressure controlling line 513 and the second hydraulic pressure controlling line 514 is subjected to the hydraulic effect, and hence is pressed towards the spring chamber 551*c* against the biasing force of the hydraulic pressure setting spring 554, and lastly positioned at a stop position closer to the spring chamber 551*c* (hereinafter referred to the preset hydraulic pressure position) as illustrated in broken line in FIGS. 14 to 16. In this embodiment, the preset hydraulic pressure position is defined by a stepped portion 558 formed on the inner periphery of the sleeve 551.

Specifically, during the movement of the control piston 552 from the initial hydraulic pressure position to the preset hydraulic pressure position, the hydraulic pressure of the hydraulic pressure setting chamber 551b is raised in compliance with the increase of the biasing force effected by the hydraulic pressure setting spring 554. Thus, this arrangement can prevent the abrupt engagement of the clutch device 71c for moderate shock during the shifting operation, prevents excessive wear of friction plates in each clutch device, and provides other desirable effects.

As illustrated in FIGS. 14 to 16, the throttle-opening control mechanism 560 includes a lid member 561 sealing an open end of the sleeve 551, defining the hydraulic pressure controlling chamber 551a in cooperation with the control piston 552 and forming therein a communication hole communicating between the hydraulic pressure controlling chamber 551a and the first hydraulic pressure controlling line 513, a sliding member 562 disposed within the communication hole of the lid member 561 in liquid tight and axially slidable manner, an HST line 563 having a first end adapted to communicate with a higher pressure line of the pair of hydraulic lines 20 in the HST 10, a hydraulic piston 564 for pressing the sliding member 562 towards the hydraulic pressure controlling chamber 551a through the hydraulic effect of the HST line 563, and a return spring 565 for biasing the sliding member 562 away from the hydraulic controlling chamber 551a.

In this embodiment, the throttle aperture 560a is formed between the inner periphery of the communication hole of the lid member 561 and the outer periphery of the sliding member 562.

Figure 17:
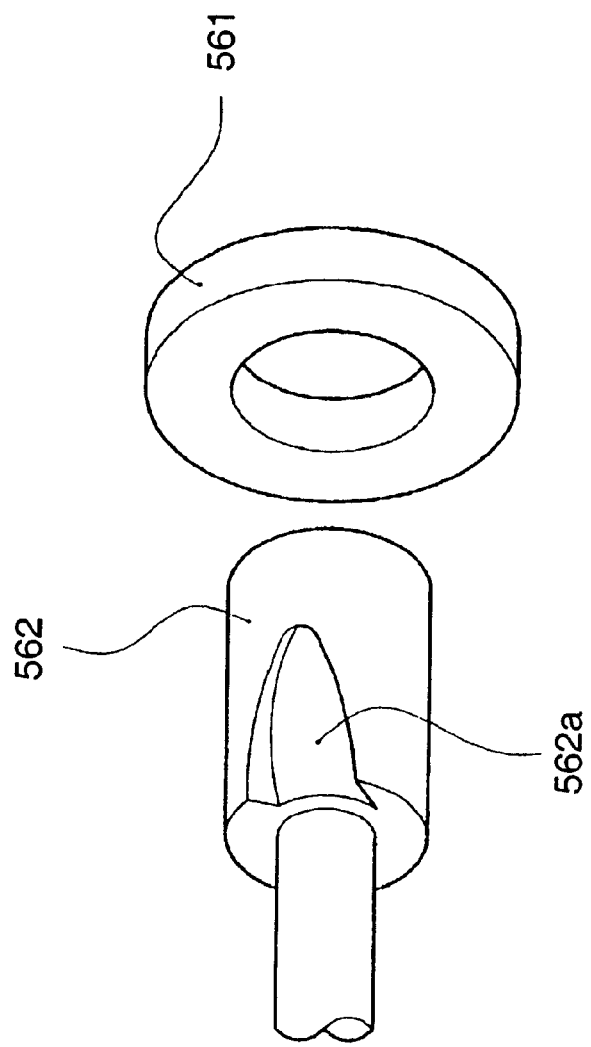
FIG. 17 is an exploded perspective view of a lid member and a sliding member in the delay relief valve illustrated in FIGS. 14 to 16.

FIG. 17 is an exploded perspective view of the lid member 561 and the sliding member 562. As illustrated in FIGS. 13 to 17, in this embodiment, the sliding member 562a has the outer periphery forming therein a throttle groove 562a extending along the axis thereof and becoming narrower as it advances from the outer end to the inner end of the sliding member 562.

As illustrated in FIG. 13, the HST line 563 has a first end connected to the second detection line 124b connected to the pair of hydraulic lines 20 via a shuttle valve, enabling the communication to a higher pressure line of the pair of hydraulic lines 20.

In the meantime, the load torque to the vehicle, which is varied according to the travelling condition of the vehicle, is proportional to the hydraulic pressure of a higher pressure line of the pair of hydraulic lines 20. That is, where the load torque of the vehicle is large, the hydraulic pressure of the higher pressure line of the pair of hydraulic lines 20 becomes higher.

As described above, the hydraulic piston 564 presses the sliding member 562 towards the hydraulic pressure controlling chamber 551a through the hydraulic pressure of the HST line 563 against the biasing force of the return spring 565. Accordingly, as illustrated in FIGS. 14 to 16, the sliding member 562 adapted to move by receiving the pressing force from the hydraulic piston 564 moves closer to the hydraulic pressure controlling chamber 551a, as the hydraulic pressure of the HST line 563 is raised to a high pressure side, so that the throttle aperture 560a can be wide open.

A wide open throttle aperture 560a allows a large amount of the working fluid to flow from the first hydraulic pressure controlling line 513 to the hydraulic pressure controlling chamber 551a. As a result, the hydraulic pressure rising speed of the hydraulic pressure controlling chamber 551a becomes higher. That is, the control piston 552 reaches the preset hydraulic pressure position in a shorter period of time, and the hydraulic pressure of the one speed-change line connected to a clutch device to be engaged also reaches the preset pressure level in a shorter period of time.

Thus, the hydraulic-pressure control mechanism 500 is designed to raise the hydraulic pressure of the one speed-change line connected to a subsequently engaging clutch device at a higher speed as the load torque to the vehicle increases.

Figure 18:
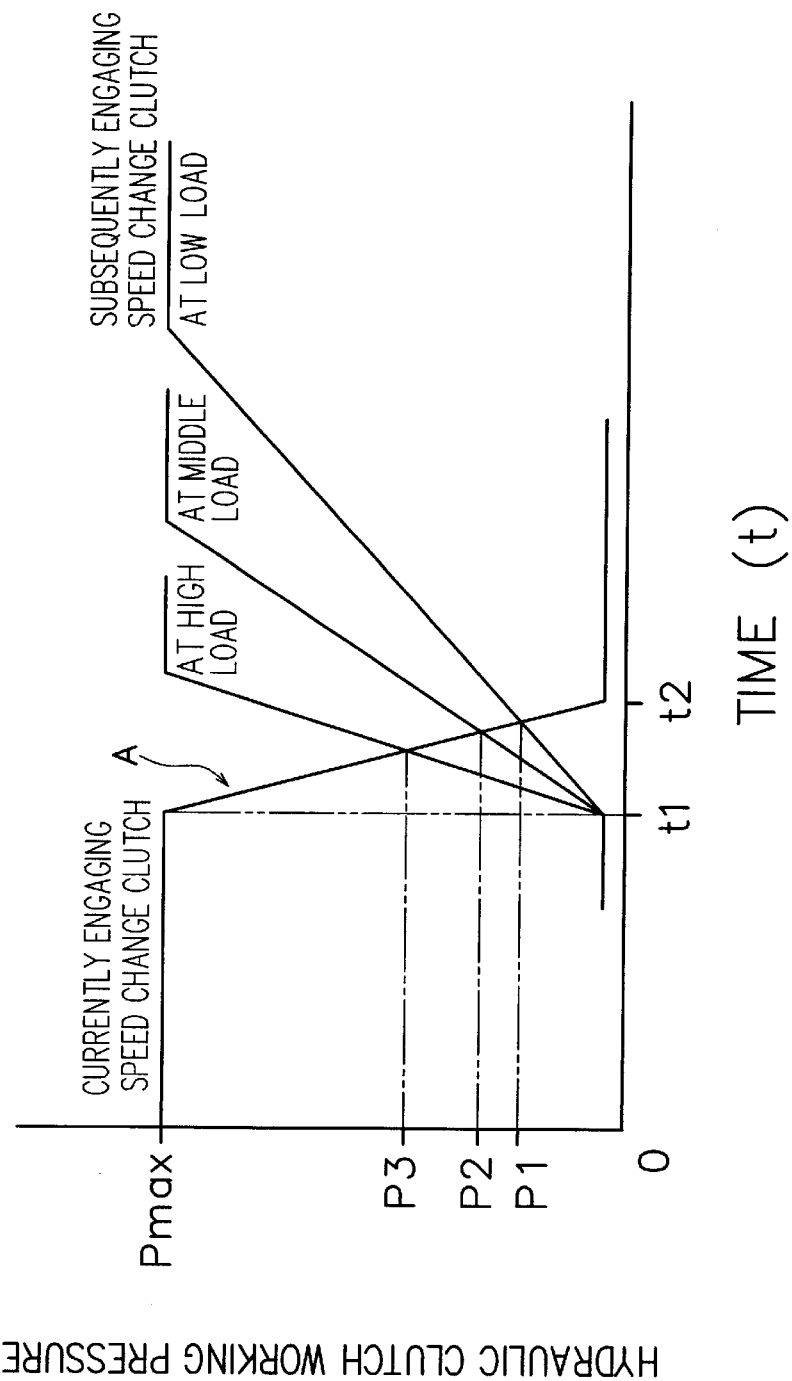
FIG. 18 is a graph showing changes in hydraulic pressure of the hydraulic circuit in a hydraulic-pressure control mechanism for the mechanical transmission.

Now, the description will be made with reference to FIG. 18 for changes in the hydraulic pressure of the one speed-change line connected to a currently engaging clutch device and changes in the hydraulic pressure of the one speed-change line connected to a subsequently engaging clutch device during the shifting operation of the mechanical transmission 60 by taking for example the case where the mechanical transmission is upshifted from the second speed stage to the third speed stage.

Where the selector valve 520 is positioned at the second speed stage engaging position, the second speed line 516b is kept at a preset hydraulic level (Pmax) set by the delay relief valve 550. The selector valve 520 is then moved to the third speed stage engaging position at time t1, enabling the second speed line 516b to communicate with the drain line 515 via the throttle valve 521. Subsequently, the hydraulic pressure of the second speed line 516b is gradually lowered from the preset hydraulic pressure to the initial hydraulic pressure level (part "A" in FIG. 8).

On the other hand, the third speed line 516c is brought into communication with the charge line 511. Before the selector valve 520 is shifted from the second speed stage engaging position to the third speed stage engaging position, the second hydraulic pressure controlling line 514, the first hydraulic pressure controlling line 513, the hydraulic pressure setting line 512 and the charge line 511 have been lowered to the initial hydraulic pressure level. Therefore, at this shifting operation (time t1), the third speed line 516c remains at the initial hydraulic pressure level.

After time t1, the hydraulic pressure of the third speed line 516c is gradually raised by the effect of the delay relief valve 550, and after the elapse of a time period, exceeds a declining hydraulic pressure level of the second speed line 516b, so that the clutch device 71c for the third speed stage is engaged. That is, a subsequently engaging clutch device is engaged at a time at which the hydraulic pressure of the one speed-change line communicating with a subsequently engaging clutch device exceeds the hydraulic pressure of the one speed-change line communicating with a currently engaging clutch device.

In this regard, as described above, the slope angle of the curve representing the hydraulic pressure increase of the one speed-change line communicating with a subsequently engaging clutch device (the third speed line in this embodiment) becomes larger, as the load torque to the vehicle becomes larger. Accordingly, as illustrated in FIG. 18, the hydraulic pressure of the third speed line 516c exceeds the hydraulic pressure of the second speed line 516b and hence the clutch device for the third speed stage is engaged in a shorter period of time, as the load torque becomes larger.

Observing the hydraulic pressure level at the switching moment to a subsequently engaging clutch device, or the time at which the hydraulic pressure of the one speed-change line communicating with a subsequently engaging clutch device exceeds the hydraulic pressure of the one speed-change line communicating with a currently engaging clutch device, the hydraulic pressure level of the high torque state, the medium torque state, and the low torque stage are respectively positioned at P3, P2 (<P3) and P1 (<P2), in which the higher the load torque to the vehicle is, the higher the hydraulic pressure at the switching moment is.

Accordingly, in the hydraulic-pressure control mechanism, the shifting operation can be performed with a larger engaging torque, as the load torque becomes larger. Whereby, it is possible to obtain a proper engaging torque with respect to the vehicle load. This can prevent the slippage of the clutch devices, and hence secure the shifting operation.

With the travelling control apparatus of this embodiment, which is equipped with the hydraulic-pressure control mechanism, a shift shock can be moderated and the excessive wear of the friction plates in each clutch device can be prevented by slowly engaging the one clutch device for a subsequently engaging speed stage in case of the low load torque state. On the other hand, in case of the high load torque state, the clutch engagement can be performed in a shorter period of time with a higher pressure, so that the variation in the vehicle speed due to the shifting operation can be limited, and a secured engagement of the clutch devices can be attained.

According to the vehicle travelling control apparatus of this embodiment, the clutch engagement of the mechanical transmission at the time of the shifting operation can be performed according to the load torque to the vehicle at ideal timing without using complicated, high-precision and expensive electronic control system.

The delay relief valve 550 can be manufactured in various forms. Specifically, the delay relief valve 550 of this embodiment is designed so that the larger the load torque to the vehicle is, the larger the rising rate of the hydraulic pressure in the one speed-change line communicating with a subsequently engaging clutch device is. Instead of it, it is possible to adjust the initial hydraulic pressure position at which the control piston 152 is initially positioned, according to the magnitude of the load torque to the vehicle. In this arrangement, it is possible to use a delay relief valve 550' equipped with a position adjusting mechanism 570 for adjusting the initial hydraulic pressure position of the control piston 552 in place of the throttle-opening control mechanism 560.

Figure 19:
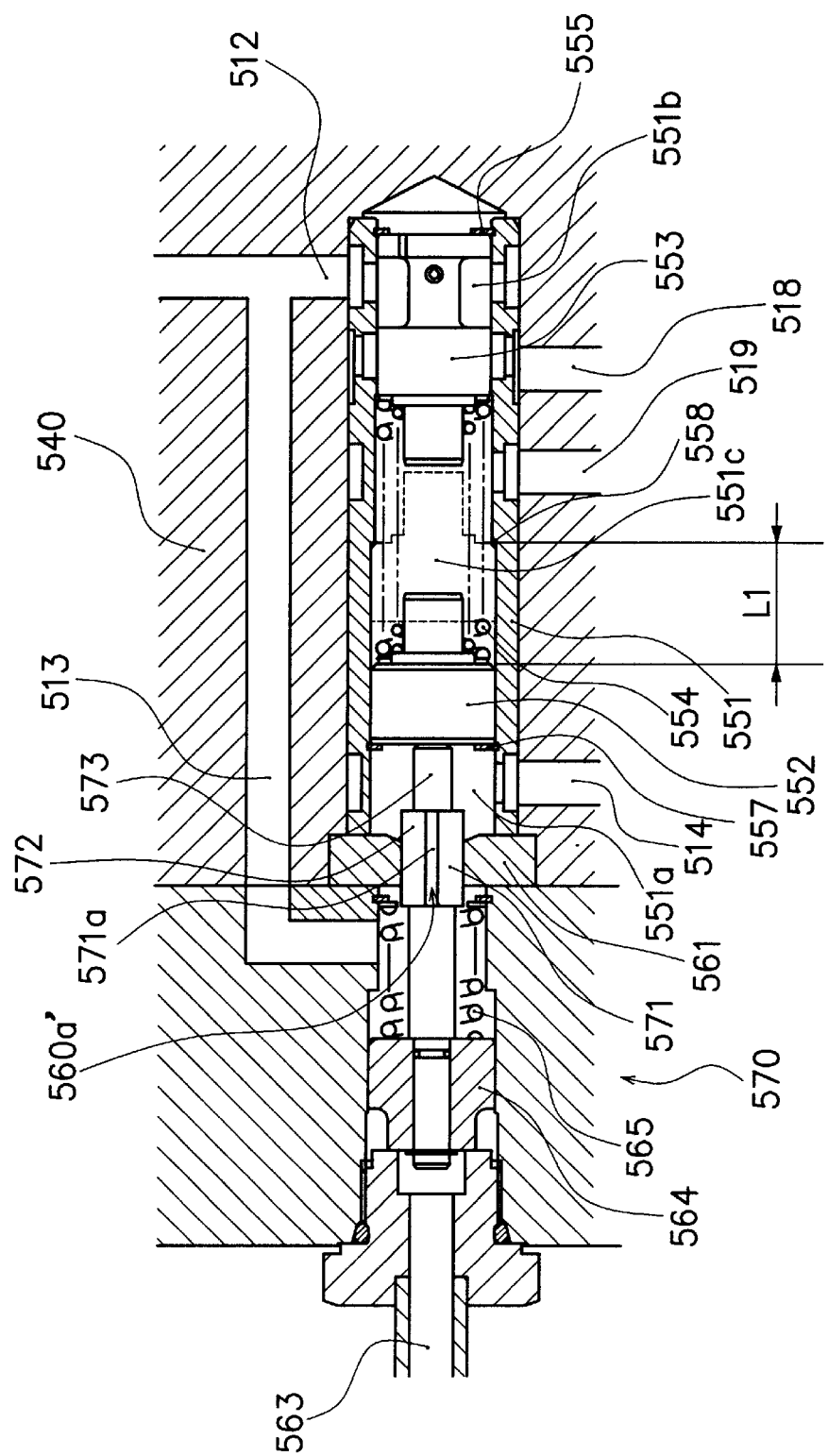
FIG. 19 is a longitudinal cross section of a modified delay relief valve, showing a low load torque state where the load torque relative to the vehicle is low.
Figure 20:
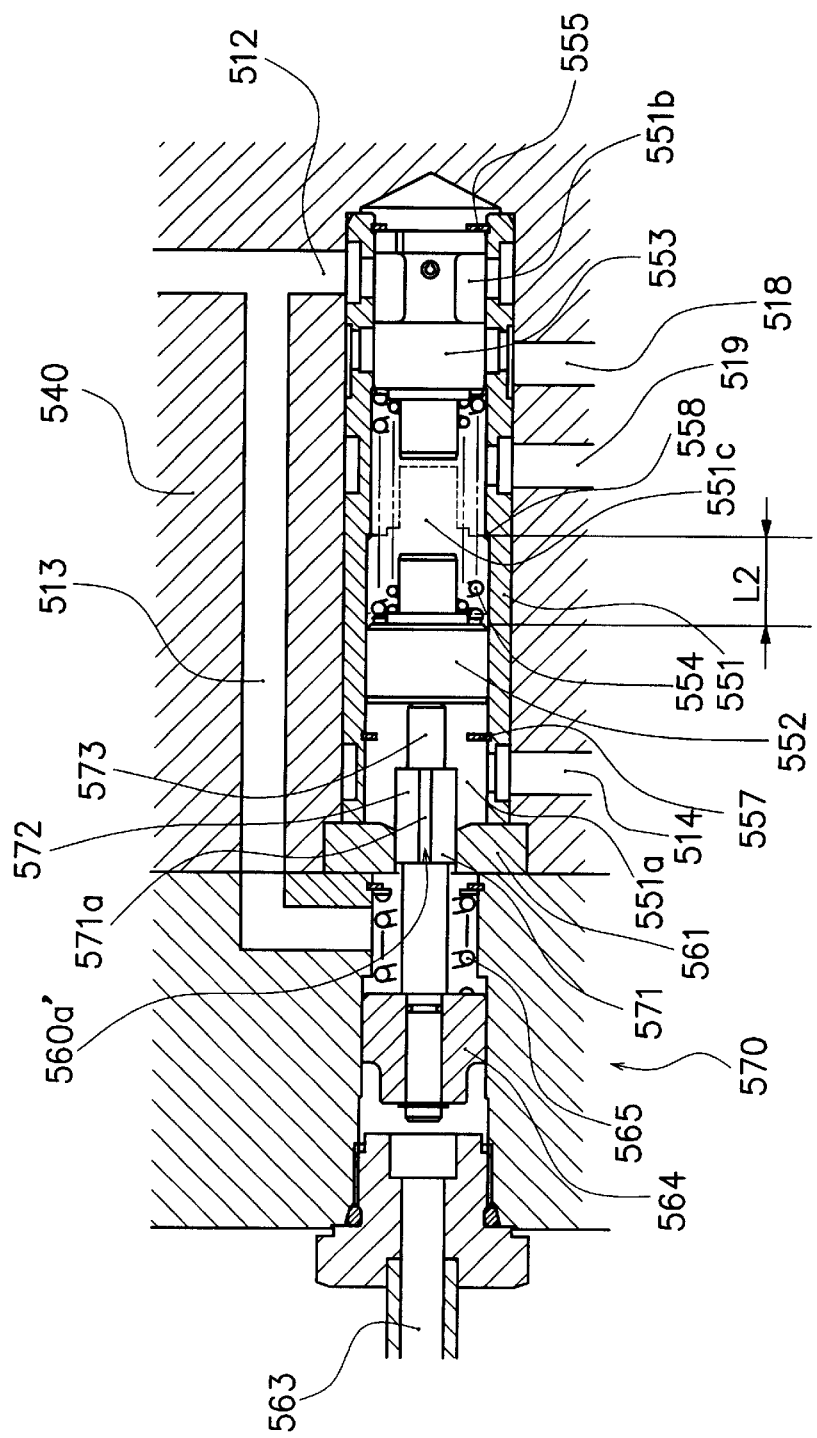
FIG. 20 is a longitudinal cross section of the delay relief valve of FIG. 19 in a medium load torque state where the load torque relative to the vehicle is medium.
Figure 21:
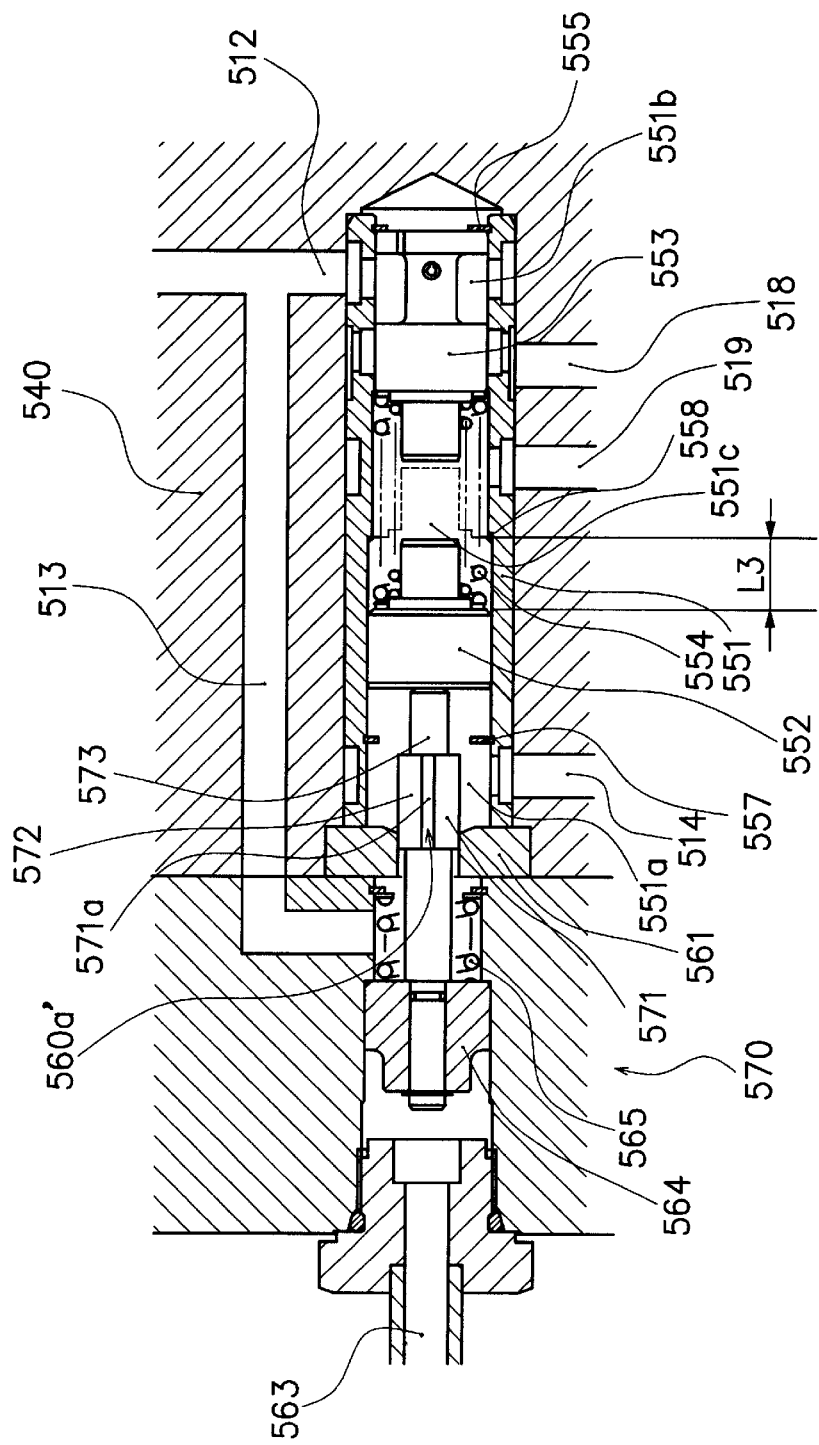
FIG. 21 is a longitudinal cross section of the delay relief valve of FIG. 19 in a high load torque state where the load torque relative to the vehicle is high.

The position adjusting mechanism 570, as illustrated in FIGS. 19 to 21, includes the lid member 561, a sliding member 571 disposed within the communication hole of the lid member 561 in liquid tight and axially slidable manner, the HST line 563, the hydraulic piston 564, and the return spring 565. That is, the difference to the delay relieve valve 550 lies only in the shape of the sliding member.

The sliding member 571 includes a body part 572 forming therein a throttle groove 571a with a uniform width extending along the axis, and an extension part 573 extending from the inner end of the body part 572 and abutting the control piston 552.

As described above, the sliding member 571 is moved closer to the hydraulic pressure controlling chamber 551a as the hydraulic pressure of the HST line 563 is raised to a high pressure side. Accordingly, as illustrated in FIGS. 19 to 21, the initial hydraulic pressure position, at which the control piston 551 is positioned when the hydraulic pressure of the working fluid lies at the initial hydraulic pressure level, is moved closer to the preset hydraulic pressure position, as the hydraulic pressure of the HST line 563 is raised to a high pressure side.

More specifically, the effective strokes of the control piston or the distances from the initial hydraulic pressure position to the preset hydraulic pressure position for the low, medium and high load torque conditions lie respectively at L1, L2(<L1), and L3(L≦L2) (see FIGS. 19 to 21).

Accordingly, in the medium load torque condition, the initial hydraulic pressure position of the control piston 151 is moved closer to the preset hydraulic pressure position by the distance corresponding to (L1-L2), as compared with the low load torque condition. Similarly, in the high load torque condition, the initial hydraulic pressure position of the control piston 151 is moved closer to the preset hydraulic pressure position by the distance corresponding to (L2-L3) as compared with the medium load torque condition.

Figure 22:
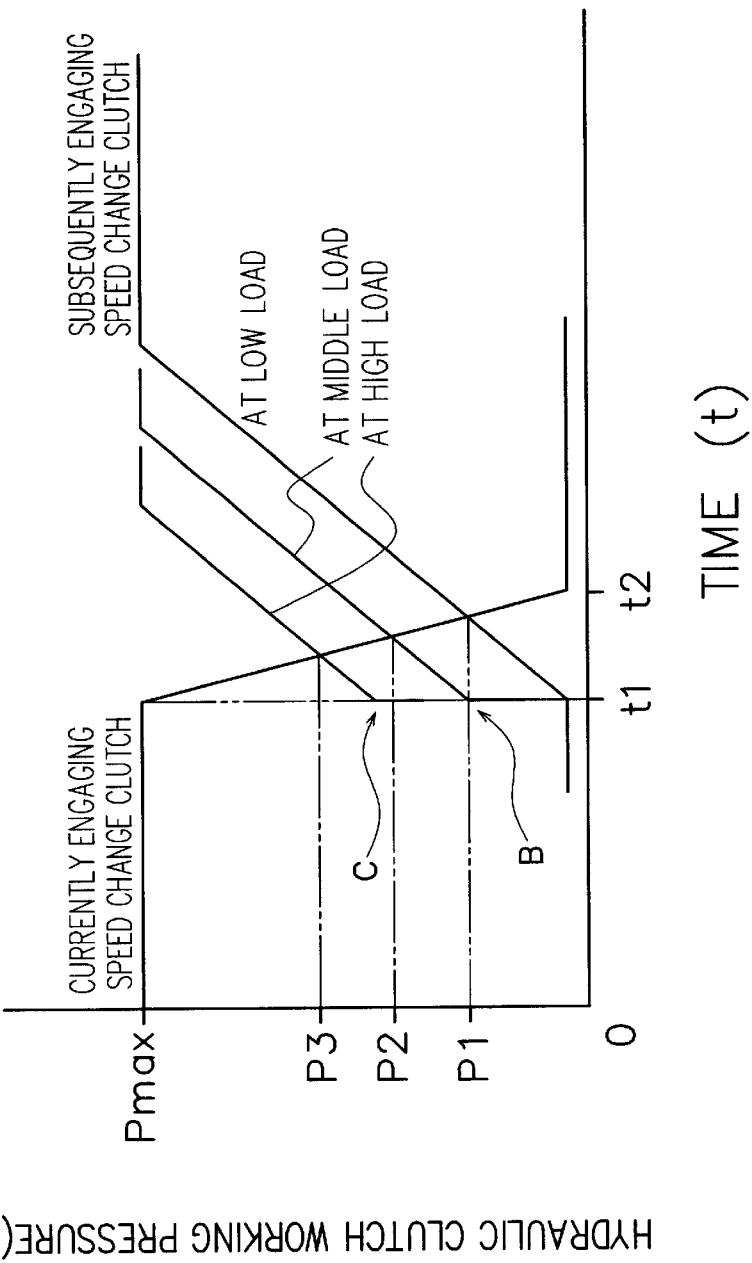
FIG. 22 is a graph showing changes in hydraulic pressure of the hydraulic circuit in the hydraulic-pressure control mechanism for the mechanical transmission, with the delay relief valve illustrated in FIGS. 19 to 21.

Consequently, considering the case where the vehicle lies in the medium load torque condition in comparison with the low load torque condition, the hydraulic pressure of a subsequently engaging speed-change line is raised to such a pressure level (the portion indicated by the arrow B in FIG. 22), through which the hydraulic pressure causes the control piston 551 to move by the distance corresponding to (L1-L2) without the influence of the biasing force of the hydraulic pressure setting spring 554, as illustrated in FIG. 22.

Turning to the case where the vehicle lies in the high load torque condition in comparison with the low load torque condition, the hydraulic pressure of a subsequently engaging speed-change line is raised to such a pressure level (the portion indicated by the arrow C in FIG. 22), through which the hydraulic pressure causes the control piston 551 to move by the distance corresponding to (L1-L3) without the influence of the biasing force of the hydraulic pressure setting spring 554.

Therefore, even if the delay relief valve 550' with the position adjusting mechanism 570 is used, it is possible to shorten a period of time after which the hydraulic pressure of the one speed-change line connected to a subsequently engaging clutch device exceeds the hydraulic pressure of the one speed-change line connected to a currently engaging clutch device and to raise a pressure level at this exceeding point, as the load torque to the vehicle is raised. Thus, this arrangement also provides the same effects as in this embodiment.

It is a matter of course to provide a delay relief valve equipped with the throttle-opening control mechanism 560 and the position adjusting mechanism 570.

This specification is by no means intended to restrict the present invention to the preferred embodiments set forth therein. Various modifications to the vehicle travelling control apparatus, as described herein, may be made by those skilled in the art without departing from the spirit and scope of the present invention as defined in the appended claims.

What is claimed is:

1. A vehicle travelling control apparatus for a vehicle with an hydrostatic transmission (HST) and a mechanical transmission connected in tandem to said HST, said HST and said mechanical transmission interposed in a travelling power transmission path between a driving power source and driving wheels, which comprises:

a speed-change control mechanism including a signal detection part and a control part for controlling the changing of the output speed of the HST and the shifting operation of the mechanical transmission;

said signal detection part including a load-torque detection means for detecting the load torque with respect to the vehicle; and said control part being designed to control the mechanical transmission and the HST based upon the detected results by said load-torque detection means so that where the vehicle lies in a high load torque state, the control part downshifts the mechanical transmission to a lower speed stage, while increasing the output speed of the HST.

2. A vehicle travelling control apparatus according to claim 1, wherein said control part is designed to control the mechanical transmission and the HST based upon the detected results by said load-torque detection means so that where the vehicle lies in a low load torque state, the control part upshifts the mechanical transmission to a higher speed stage, while decreasing the output speed of the HST.

3. A vehicle travelling control apparatus according to claim 2, wherein:

said HST includes a hydraulic pump and a hydraulic motor connected to said hydraulic pump via a pair of hydraulic lines;

said load-torque detection means is designed to detect whether the hydraulic pressure of said pair of hydraulic lines is above a reference level of high pressure side or below a reference level of low pressure side, thereby detecting which state out of the high load torque state, the low load torque state and a proper load torque state the vehicle lies in;

said control part includes a memory for storing data concerning the relationship between the hydraulic pressure of said pair of hydraulic lines and the load torque of said HST, and a processor for calculating control signals transmitted to said HST and said mechanical transmission; and said processor is designed to output control signals for said mechanical transmission and said HST based upon the detected signals from said load-torque detection means.

4. A vehicle travelling control apparatus according to claim 3, wherein:

said HST has an output control member;

said signal detection part includes a displacement-amount detection means for detecting the displacement amount of said output control member of the HST, and a lever pivoting angle detection means for detecting the pivoting angle of a operation lever designed to manually control the output control member of the HST;

said memory is also designed to store data concerning a vehicle-speed-to-displacement-amount-relationship which is the relationship between the displacement amount of said output control member and a vehicle speed for each speed of said mechanical transmission; and said processor is designed to detect by using the displacement amount of said output control member inputted from said displacement-amount detection means a current vehicle speed based upon said vehicle-speed-to-displacement-amount-relationship in a currently engaging speed stage of said mechanical transmission, and determine by using said detected current vehicle speed whether the mechanical transmission lies in a state enabling its shifting operation, based upon the vehicle-speed-to-displacement-amount-relationship in a speed stage of the mechanical transmission to be subsequently engaged.

5. A vehicle travelling control apparatus according to claim 4, wherein:

said processor is designed to control by using said detected current vehicle speed said output control member so as to prevent variation of the vehicle speed due to the shifting operation of the mechanical transmission, based upon the vehicle-speed-to-displacement-amount-relationship in a speed stage of the mechanical transmission to be subsequently engaged, where said processor has determined that the shifting operation of the mechanical transmission can be performed.

6. A vehicle travelling control apparatus according to claim 1 further comprising:

a hydraulic-pressure control mechanism for controlling the hydraulic pressure of working fluid for effecting engagement and disengagement of clutch devices in said mechanical transmission;

said hydraulic-pressure control mechanism including a hydraulic circuit acting as a feeding passage of said working fluid, and a delay relief valve disposed within said hydraulic circuit for gradually increasing the hydraulic pressure of the working fluid fed to a clutch device of said clutch devices to be subsequently engaged from an initial hydraulic pressure level to a preset hydraulic pressure level; and said delay relief valve is designed so that the diameter of a throttle aperture for regulating the amount of the working fluid acting on a control piston of said delay relief valve is enlarged according to the increase of the hydraulic pressure in a hydraulic circuit of the HST.

7. A vehicle travelling control apparatus according to claim 1 further comprising:

a hydraulic-pressure control mechanism for controlling the hydraulic pressure of working fluid for effecting engagement and disengagement of clutch devices in said mechanical transmission;

said hydraulic-pressure control mechanism including a hydraulic circuit acting as a feeding passage of said working fluid, and a delay relief valve disposed within said hydraulic circuit for gradually increasing the hydraulic pressure of the working fluid fed to a subsequently engaging clutch device of said clutch devices from an initial hydraulic pressure level to a preset hydraulic pressure level; and said delay relief valve is designed so that the hydraulic pressure of the working fluid causes a control piston of said delay relief valve to move from an initial hydraulic pressure position to a preset hydraulic pressure position, against the biasing force of a hydraulic pressure setting spring biasing a valve, which is adapted to effect communication with and shutting off to a drain line, towards a side enabling said shutting off to the drain line, when said delay relieve valve gradually increases the hydraulic pressure of the working fluid from the initial hydraulic pressure level to the preset hydraulic pressure level, and said delay relief valve is also designed so that said initial hydraulic pressure position of said control piston moves closer to said preset hydraulic pressure position according to the increase of the hydraulic pressure in a hydraulic circuit of said HST.

8. A vehicle travelling control apparatus according to claim 1 further comprising:

a hydraulic-pressure control mechanism for controlling the hydraulic pressure of working fluid for effecting engagement and disengagement of clutch devices in said mechanical transmission;

said hydraulic-pressure control mechanism including a hydraulic circuit acting as a feeding passage of said working fluid, and a delay relief valve disposed within said hydraulic circuit for gradually increasing the hydraulic pressure of the working fluid fed to a subsequently engaging clutch device of said clutch devices from an initial hydraulic pressure level to a preset hydraulic pressure level; and said delay relief valve is designed so that the hydraulic pressure of the working fluid causes a control piston of said delay relief valve to move from an initial hydraulic pressure position to a preset hydraulic pressure position, against the biasing force of a hydraulic pressure setting spring biasing a valve, which is adapted to effect communication with and shutting off to a drain line towards a side enabling said shutting off to the drain line, when said delay relieve valve gradually increases the hydraulic pressure of the working fluid from the initial hydraulic pressure level to the preset hydraulic pressure level, said delay relief valve is also designed so that the diameter of a throttle aperture for regulating the amount of the working fluid acting on said control piston is enlarged according to the increase of the hydraulic pressure in a hydraulic circuit of the HST, and said delay relief valve is designed so that said initial hydraulic pressure position of said control piston moves closer to said preset hydraulic pressure position according to the increase of the hydraulic pressure in a hydraulic circuit in said HST.

* * * * *